US010581856B2

(12) United States Patent
Yan

(10) Patent No.: US 10,581,856 B2
(45) Date of Patent: Mar. 3, 2020

(54) METHOD AND APPARATUS FOR HETEROGENEOUS DATA STORAGE MANAGEMENT IN CLOUD COMPUTING

(71) Applicant: Nokia Technologies Oy, Espoo (FI)

(72) Inventor: Zheng Yan, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 128 days.

(21) Appl. No.: 15/542,952

(22) PCT Filed: Jan. 19, 2015

(86) PCT No.: PCT/CN2015/071013
§ 371 (c)(1),
(2) Date: Jul. 12, 2017

(87) PCT Pub. No.: WO2016/115663
PCT Pub. Date: Jul. 28, 2016

(65) Prior Publication Data
US 2018/0034819 A1    Feb. 1, 2018

(51) Int. Cl.
*H04L 29/06* (2006.01)
*H04L 29/08* (2006.01)

(52) U.S. Cl.
CPC .......... *H04L 63/10* (2013.01); *H04L 63/0428* (2013.01); *H04L 63/06* (2013.01);
(Continued)

(58) Field of Classification Search
CPC ..... H04L 63/10; H04L 63/0428; H04L 63/06; H04L 67/10; H04L 67/1097; H04L 67/1095
See application file for complete search history.

(56) References Cited

U.S. PATENT DOCUMENTS 6,598,161 B1    7/2003   Kluttz et al.
7,567,188 B1 *  7/2009   Anglin ................. G06F 3/0608
                                          341/63
(Continued)

FOREIGN PATENT DOCUMENTS

CN   101589400 A   11/2009
CN   102014133 A    4/2011
(Continued)

OTHER PUBLICATIONS

Chow et al., "Controlling Data in the Cloud: Outsourcing Computation without Outsourcing Control", Proceedings of the 2009 ACM workshop on Cloud computing security, Nov. 2009, pp. 85-90.
(Continued)

*Primary Examiner* — Chau Le
*Assistant Examiner* — Vance M Little
(74) *Attorney, Agent, or Firm* — Squire Patton Boggs (US) LLP

(57) ABSTRACT

Method and apparatus are disclosed for heterogeneous data storage management in cloud computing. According to some embodiments, a method for managing data storage in a communication network comprises: receiving at a data center in the communication network from a first device, a request for storing a data in the data center; checking whether the same data has been stored in the data center; in response to a check result that no same data has been stored in the data center, receiving from the first device a data package containing at least the data in plaintext or ciphertext (CT) in response to a check result that the same data has been stored in the data center, obtaining a deduplication policy for the data; when the deduplication policy indicates deduplication to be controlled by both or either of an authorized party (AP) and an owner of the data, or only the AP, or only the data owner, contacting both or either of the (Continued)

AP and the data owner, or only the AP, or only the data owner to conduct deduplication for the data; and when the deduplication policy indicates deduplication to be controlled by none of the AP and the data owner, conducting deduplication for the data at the data center. In some embodiments, the data package may contain or indicate the deduplication policy, and contain information for data holdership verification. The data center may challenge to ensure the data holdership before contacting to conduct deduplication or conducting deduplication at the data center.

20 Claims, 12 Drawing Sheets

(52) U.S. Cl.
CPC .......... *H04L 67/10* (2013.01); *H04L 67/1095* (2013.01); *H04L 67/1097* (2013.01)

(56) References Cited

U.S. PATENT DOCUMENTS

| | | | | |
|---|---|---|---|---|
| 7,814,149 | B1* | 10/2010 | Stringham | G06F 16/1748 709/203 |
| 9,076,004 | B1* | 7/2015 | Bogorad | G06F 21/602 |
| 9,202,076 | B1* | 12/2015 | Chazin | G06F 21/6218 |
| 9,367,559 | B1* | 6/2016 | Zhang | G06F 11/1451 |
| 9,390,101 | B1* | 7/2016 | Schneider | G06F 16/1748 |
| 2006/0179489 | A1 | 8/2006 | Mas Ribes | |
| 2007/0286393 | A1* | 12/2007 | Roever | H04L 12/2856 379/221.1 |
| 2008/0059787 | A1* | 3/2008 | Hohenberger | H04L 9/3013 713/153 |
| 2008/0104393 | A1* | 5/2008 | Glasser | G06F 21/6218 713/165 |
| 2009/0013172 | A1 | 1/2009 | Ju et al. | |
| 2009/0313483 | A1* | 12/2009 | Ranade | G06F 11/1453 713/193 |
| 2010/0205430 | A1 | 8/2010 | Chiou et al. | |
| 2011/0016095 | A1 | 1/2011 | Anglin et al. | |
| 2011/0099203 | A1 | 4/2011 | Fastring | |
| 2012/0036360 | A1 | 2/2012 | Bassu et al. | |
| 2012/0054827 | A1 | 3/2012 | Hom et al. | |
| 2012/0076300 | A1 | 3/2012 | Uchida et al. | |
| 2012/0166806 | A1 | 6/2012 | Zhang et al. | |
| 2012/0173558 | A1* | 7/2012 | Sorenson, III | G06F 16/215 707/758 |
| 2012/0260094 | A1* | 10/2012 | Asim | G06F 21/10 713/171 |
| 2013/0024424 | A1* | 1/2013 | Prahlad | G06F 3/0649 707/640 |
| 2013/0151759 | A1* | 6/2013 | Shim | G06F 12/0246 711/103 |
| 2013/0290274 | A1 | 10/2013 | Patil et al. | |
| 2014/0006465 | A1* | 1/2014 | Davis | G06F 16/182 707/827 |
| 2014/0075193 | A1 | 3/2014 | Wang | |
| 2014/0108332 | A1* | 4/2014 | Haze | G06F 9/44505 707/609 |
| 2014/0143548 | A1* | 5/2014 | Wang | H04L 9/0897 713/171 |
| 2014/0229440 | A1* | 8/2014 | Venkatesh | G06F 3/061 707/634 |
| 2015/0066873 | A1* | 3/2015 | Voruganti | G06F 16/1748 707/692 |
| 2015/0222605 | A1* | 8/2015 | Ignatenko | H04L 9/088 713/168 |
| 2016/0065540 | A1* | 3/2016 | Androulaki | G06F 16/00 713/171 |

FOREIGN PATENT DOCUMENTS

| | | |
|---|---|---|
| CN | 102244576 A | 11/2011 |
| CN | 102369686 A | 3/2012 |
| CN | 102546764 A | 7/2012 |
| CN | 102571746 A | 7/2012 |
| CN | 102629940 A | 8/2012 |
| CN | 103095847 A | 5/2013 |
| CN | 103377285 A | 10/2013 |
| CN | 103763362 A | 4/2014 |
| JP | 2006-345160 A | 12/2006 |
| JP | 2007-129413 A | 5/2007 |
| JP | 2010-103943 A | 5/2010 |
| JP | 2011-510405 A | 3/2011 |
| JP | 2012-533126 A | 12/2012 |
| JP | 2014-519099 A | 8/2014 |
| WO | 2008/090779 A1 | 7/2008 |
| WO | 2009/091957 A2 | 7/2009 |
| WO | 2010/116845 A1 | 10/2010 |
| WO | 2011/006859 A1 | 1/2011 |
| WO | 2011/070393 A1 | 6/2011 |
| WO | 2012/158654 A2 | 11/2012 |
| WO | 2013/085519 A1 | 6/2013 |
| WO | 2014/043894 A1 | 3/2014 |
| WO | 2014/064323 A1 | 5/2014 |
| WO | 2014/154973 A1 | 10/2014 |
| WO | WO-2015031773 A1 * | 3/2015 |

OTHER PUBLICATIONS

Kamara et al., "Cryptographic Cloud Storage", International Conference on Financial Cryptography and Data Security, 2010, pp. 1-14.
Liu et al., "Efficient Information Retrieval for Ranked Queries in Cost-Effective Cloud Environments", Proceedings IEEE internation conference on conputer communications: mini conference, 2012, pp. 2581-2585.
Kallahalla et al., "Plutus: Scalable Secure File Sharing on Untrusted Storage", Proceedings of the 2nd USENIX Conference on File and Storage Technologies, Mar. 31-Apr. 2, 2003, 14 pages.
Goh et al., "Sirius: Securing Remote Untrusted Storage", Proceedings of the Network and Distributed System Security Symposium, 2003, 15 pages.
Bethencourt et al., "Ciphertext-Policy Attribute-Based Encryption", IEEE Symposium on Security and Privacy, May 20-23, 2007, 14 pages.
Goyal et al., "Attribute-Based Encryption for Fine-Grained Access Control of Encrypted Data", Proceedings of the 13th ACM conference on Computer and communications security, Oct. 30-Nov. 3, 2006, pp. 89-98.
Muller et al., "Distributed Attribute-Based Encryption", Information Security and Cryptology, 2009, pp. 20-36.
Sahai et al., "Fuzzy Identity-Based Encryption", 24th Annual International Conference on the Theory and Applications of Cryptographic Techniques, May 22-26, 2005, 17 pages.
Yu et al., "Achieving Secure, Scalable, and Fine-grained Data Access Control in Cloud Computing", Proceedings IEEE INFOCOM, Mar. 14-19, 2010, 9 pages.
Wang et al., "Hierarchical Attribute-Based Encryption and Scalable User Revocation for Sharing Data in Cloud Servers", Computers & Security, vol. 30, No. 5, 2011, pp. 320-331.
Yu et al., "Attribute Based Data Sharing With Attribute Revocation", Proceedings of the 5th ACM Symposium on Information, Computer and Communications Security, Apr. 13-16, 2010, pp. 261-270.
Wang et al., "Hierarchical Attribute-Based Encryption for Fine-grained Access Control in Cloud Storage Services", Proceedings of the 17th ACM conference on Computer and communications security, Oct. 4-8, 2010, pp. 735-737.
Zhou et al., "Privacy-Preserved Access Control for Cloud Computing", IEEE 10th International Conference on Trust, Security and Privacy in Computing and Communications, 2011, pp. 83-90.
Pirretti et al., "Secure Attribute-Based Systems" Proceedings of the 13th ACM conference on Computer and communications security, Oct. 30-Nov. 3, 2006, pp. 99-112.

(56) References Cited

OTHER PUBLICATIONS

Blaze et al., "Divertible Protocols and Atomic Proxy Cryptography", International Conference on the Theory and Applications of Cryptographic Techniques, 1998, pp. pp. 127-144.
Green et al., "Identity-Based Proxy Re-Encryption", Proceedings of the 5th international conference on Applied Cryptography and Network Security, Jun. 5-8, 2007, pp. 1-21.
Yan, "A Comprehensive Trust Model for Component Software", Proceedings of the 4th international workshop on Security, privacy and trust in pervasive and ubiquitous computing, Jul. 7, 2008, pp. 1-6.
Ateniese et al., "Improved Proxy Re-Encryption Schemes with Applications to Secure Distributed Storage", ACM Transactions on Information and System Security, vol. 9, No. 1, Feb. 2006, pp. 1-30.
Hwang et al., "Cloud Security with Virtualized Defense and Reputation-based Trust Mangement", Eighth IEEE International Conference on Dependable, Autonomic and Secure Computing, 2009, pp. 717-722.
Wang et al., "Privacy-preserving Public Auditing for Data Storage Security in Cloud Computing", Proceedings IEEE INFOCOM, 2010, 9 pages.
International Search Report and Written Opinion received for corresponding Patent Cooperation Treaty Application No. PCT/CN2012/083601, dated Aug. 1, 2013, 11 pages.
Rashid et al., "A Secure Data Deduplication Framework for Cloud Environments", Tenth Annual International Conference on Privacy, Security and Trust, Jul. 16-18, 2012, pp. 81-87.
Xu et al., "SHHC: A Scalable Hybrid Hash Cluster for Cloud Backup Services in Data Centers", 31st International Conference on Distributed Computing Systems Workshops, Jun. 20-24, 2011, pp. 61-65.
Krishnaprasad et al., "A Proposal for Improving Data Deduplication with Dual Side Fixed Size Chunking Algorithm", Third International Conference on Advances in Computing and Communications, Aug. 29-31, 2013, pp. 13-16.
Puzio et al., "ClouDedup: Secure Deduplication with Encrypted Data for Cloud Storage", 5th International Conference on Cloud Computing Technology and Science, Dec. 2-5, 2013, pp. 363-370.
Wan et al., "HASBE: A Hierarchical Attribute-Based Solution for Flexible and Scalable Access Control in Cloud Computing", IEEE Transactions on Information Forensics and Security, vol. 7, No. 2, 2012, pp. 743-754.
Tang et al., "Secure Overlay Cloud Storage with Access Control and Assured Deletion", IEEE Transactions on Dependable and Secure Computing, vol. 9, No. 6, 2012, pp. 903-916.
Bellare et al., "DupLESS: Server Aided Encryption for Deduplicated Storage", Proceedings of the 22nd USENIX conference on Security, 2013, pp. 1-16.
"Dropbox, a File-Storage and Sharing Service", Dropbox, Retrieved on May 30, 2017, Webpage available at : https://www.dropbox.com/?landing=dbv2.
"Google Drive", Google, Retrieved on May 30, 2017, Webpage available at : https://www.google.com/intl/en/drive/.
"MOZY. Mozy, a File-Storage and Sharing Service", MOZY, Retrieved on May 30, 2017, Webpage available at : http://mozy.com/#slide-9.
Douceur et al., "Reclaiming Space from Duplicate Files in a Serverless Distributed File System", Proceedings 22nd International Conference on Distributed Computing Systems, 2002, 8 pages.
Wallace et al., "Characteristics of Backup Workloads in Production Systems", Proceedings of the 10th USENIX conference on File and Storage Technologies, 2012, pp. 1-16.
Zooko Wilcox-O'Hearn, "Convergent Encryption Reconsidered", The Mail Archive, 2008, pp. 1-6.
Yang et al., "Provable Ownership of File in De-Duplication Cloud Storage", IEEE Global Communications Conference, 2013, pp. 695-700.
Wu et al., "Improving Accessing Efficiency of Cloud Storage Using De-Duplication and Feedback Schemes", IEEE Systems Journal, vol. 8, No. 1, Mar. 2014, pp. 208-218.
Fan et al., "Hybrid Data Deduplication in Cloud Environment", International Conference on Information Security and Intelligent Control, Aug. 14-16, 2012, pp. 174-177.
Yuan et al., "Secure and Constant Cost Public Cloud Storage Auditing With Deduplication", IEEE Conference on Communications and Network Security, 2013, 9 pages.
Kaaniche et al., "A Secure Client Side Deduplication Scheme in Cloud Storage Environments", 6th International Conference on New Technologies, Mobility and Security, Mar. 30-Apr. 2, 2014, 7 pages.
International Search Report and Written Opinion received for corresponding Patent Cooperation Treaty Application No. PCT/CN2015/071013, dated Oct. 19, 2015, 11 pages.
Non-Final Office action received for corresponding U.S. Appl. No. 14/435,843, dated Nov. 13, 2015, 13 pages.
Final Office action received for corresponding U.S. Appl. No. 14/435,843, dated Mar. 18, 2016, 15 pages.
Extended European Search Report received for corresponding European Patent Application No. 12887182.9, dated May 2, 2016, 7 pages.
Adamouski, "Encryption Technology other than PKI", Proceedings International Carnahan Conference on Security Technology, Oct. 12-14, 1998, pp. 108-116.
He et al., "Non-Transferable Proxy Re-Encryption Scheme for Data Dissemination Control", International Association Cryptologic Research, 2011, pp. 1-30.
Non-Final Office action received for corresponding U.S. Appl. No. 14/435,843, dated Jul. 19, 2016, 16 pages.
Office action received for corresponding Chinese Patent Application No. 201280076642.9, dated Dec. 29, 2016, 31 pages of office action and 5 pages of office action translation available.
Office action received for corresponding Japanese Patent Application No. 2017-536778, dated Aug. 1, 2018, 5 pages of office action and 4 pages of translation available.
Takahashi et al., "Multitenant Cloud Computing: Security Challenges and Approaches", The Institute of Electronics Information and Communication Engineers (IEICE) Technical Report, vol. 111, No. 309, Nov. 2011, pp. 2-12.
Office action received for corresponding Chinese Patent Application No. 201280076642.9, dated Aug. 28, 2017, 3 pages of office action and 3 pages of translation available.
Extended European Search Report received for corresponding European Patent Application No. 15878341.5, dated Jul. 18, 2018, 11 pages.
European Office Action corresponding to EP 15 878 341.5, dated Oct. 11, 2019.
Chinese Office Action corresponding to CN Appln. No. 201580073740.0, dated Nov. 13, 2019.

\* cited by examiner

METHOD AND APPARATUS FOR HETEROGENEOUS DATA STORAGE MANAGEMENT IN CLOUD COMPUTING

RELATED APPLICATION

This application was originally filed as PCT Application No. PCT/CN2015/071013 filed Jan. 19, 2015.

FIELD OF THE INVENTION

Embodiments of the disclosure generally relate to data storage management in a communication network, and, more particularly, to heterogeneous data storage management in cloud computing.

BACKGROUND

Cloud computing is computing in which large groups of remote servers are networked to allow centralized data storage, and online access to computer services or resources. It offers a new way of Information Technology (IT) services by rearranging various resources (e.g., storage, computing and services) and providing them to users based on their demands. Cloud computing provides a big resource pool by linking network resources together. It has desirable properties, such as scalability, elasticity, fault-tolerance, and pay-per-use. Thus, it becomes a promising service platform, rearranging the structure of IT.

Storage service is one of the most widely consumed cloud services. Nowadays, various data are stored at cloud, e.g., sensitive personal information, personal data, publicly shared data, limited shared data with a group of people and so on. Particularly, crucial data should be protected at the cloud to prevent from any access from unauthorized parties. Some unimportant data, however, has no such a demand. Thus, managing data storage at cloud in various situations in an efficient and flexible way is an important task for cloud service providers (CSP).

Further, for example, duplicated data may be stored at the cloud by the same users or different users, especially for shared data, in the same CSP or cross CSPs. Although cloud storage space is huge, this kind of duplication may greatly waste networking resources, consume a lot of power energy, increase operation cost, or make data management complicated. Thus, economic storage will greatly benefit CSPs by reducing operation cost and reversely benefit cloud users with reduced service fee.

In view of this, it would be advantageous to provide a way to allow for efficiently, flexibly and economically managing data storage in cloud computing.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to one aspect of the disclosure, it is provided a method for managing data storage in a communication network, the method comprising: receiving at a data center in the communication network from a first device, a request for storing a data in the data center; checking whether the same data has been stored in the data center; in response to a check result that no same data has been stored in the data center, receiving from the first device a data package containing at least the data in plaintext or ciphertext (CT); in response to a check result that the same data has been stored in the data center, obtaining a deduplication policy for the data; when the deduplication policy indicates deduplication to be controlled by both or either of an authorized party (AP) and an owner of the data, or only the AP, or only the data owner, contacting both or either of the AP and the data owner, or only the AP, or only the data owner to conduct deduplication for the data; and when the deduplication policy indicates deduplication to be controlled by none of the AP and the data owner, conducting deduplication for the data at the data center.

According to another aspect of the disclosure, the data package further contains an index list and a hash chain information, the index list including a plurality of indexes each indicating a specific part of the data, the hash chain information including a plurality of hash information each corresponding to one index; wherein contacting to conduct deduplication or conducting deduplication for the data comprises: requesting the first device to transmit a hash information corresponding to at least one index from the index list; verifying whether the first device holds the data based on the hash information from the first device corresponding to the requested at least one index; and in response to a positive verification result, contacting to conduct deduplication or recording a deduplication information of the data for the first device.

According to another aspect of the disclosure, obtaining the deduplication policy for the data comprises reading the deduplication policy stored in advance in the data center, or receiving the deduplication policy from the data owner, or determining the deduplication policy according to the data package.

According to another aspect of the disclosure, determining the deduplication policy comprises: when the data package further contains a first cipherkey (CK) and a second CK being not equal to each other, determining deduplication to be controlled by both of the AP and the data owner, the first and second CKs being generated by separating a data encryption key (DEK) into a first DEK and a second DEK and encrypting the first and second DEKs respectively, the DEK being used for encrypting the data to obtain the CT; when the data package further contains the first and second CKs being equal to each other, determining deduplication to be controlled by either of the AP or the data owner; when the data package further contains only the first CK or only the second CK, determining deduplication to be controlled by only the AP or only the data owner; and when the data package contains no CK, determining deduplication to be controlled by none of the AP and the data owner.

According to another aspect of the disclosure, contacting the AP to conduct deduplication for the data comprises: receiving a re-encryption key for the first device from the AP when it is not available; re-encrypting the first CK with the re-encryption key according to a proxy re-encryption (PRE) scheme; and transmitting the re-encrypted first CK to the first device such that the first device can decrypt the re-encrypted first CK with a secret key of the first device.

According to another aspect of the disclosure, contacting the data owner to conduct deduplication for the data comprises: transmitting an attribute identity (ID) of the first device to the data owner such that the data owner can issue an attribute secret key for the first device when it is eligible to decrypt the second CK according to an attribute based encryption (ABE) scheme.

According to another aspect of the disclosure, the method further comprises: in response to a check result that no same data has been stored in the data center, requesting at least one further data center to check whether the same data has been stored in it; in response to a positive reply from the at least one further data center, recording a deduplication information of the data for the first device, wherein the at least one further data center is able to conduct deduplication for the data; in response to a negative reply from the at least one further data center, performing data storage accordingly.

According to another aspect of the disclosure, the method further comprises: receiving at the data center from a second device, a request for deleting a data; checking whether the data is stored by the second device in the data center; in response to a positive check result, deleting a record of storage of the data for the second device; deleting the data when a deduplication record for the data is empty; and notifying an owner of the data for updating the CT when the deduplication record for the data is not empty; and in response to a negative check result, contacting another data center that stores the data, wherein the another data center is able to delete a record of storage of the data for the second device.

According to another aspect of the disclosure, the method further comprises: notifying the owner for updating the CT comprises: inquiring whether the owner decides to continue deduplication control; in response to a positive decision, cooperating with the data owner to update the CT according to the deduplication policy of the data; in response to a negative decision, requesting another holder of the data for updating the CT, or cooperating with the data owner to update the CT according to a new deduplication policy, the new deduplication policy indicating deduplication to be controlled by only the AP.

According to another aspect of the disclosure, the method further comprises: in response to a request for updating the CT of a data, obtaining the deduplication policy for the data; when the deduplication policy indicates that AP deduplication control is needed, re-encrypting the updated first CK with the re-encryption key according to a PRE scheme; and transmitting the re-encrypted updated first CK to the first device such that the first device can decrypt the re-encrypted updated first CK with a secret key of the first device; when the deduplication policy indicates that a deduplication control by the data owner is needed, informing the data owner the data identifier and the public key information of the data holder according to a ABE scheme when necessary in order to allow the data owner to perform data deduplication by issuing a secret key to the first device that can decrypt the updated second CK.

According to another aspect of the disclosure, it is provided a method for managing data storage in a user device, the method comprising: transmitting at the user device, a request for storing a data to a data center; in response to a request for the data from the data center, transmitting a data package containing at least the data in plaintext or ciphertext (CT) to the data center, wherein a deduplication policy for the data is contained in the data package or can be determined according to the data package, the deduplication policy indicating deduplication to be controlled by both or either or none of an authorized party (AP) and an owner of the data, or only the AP, or only the data owner; in response to a deduplication request for the data from the data center or at least one further data center, issuing an attribute secret key to an eligible data holder according to an attribute based encryption (ABE) scheme for conducting deduplication.

According to another aspect of the disclosure, the method further comprises: transmitting in the data package an index list and a hash chain information for verifying holdership of the data for an eligible data holder, the index list including a plurality of indexes each indicating a specific part of the data, the hash chain information including a plurality of hash information each corresponding to one index.

According to another aspect of the disclosure, the method further comprises: transmitting a request for storing a second data to the data center; in response to a request for a hash information corresponding to at least one index from the data center, transmitting a calculated hash information corresponding to the at least one index to the data center for verifying the holdership of the second data.

According to another aspect of the disclosure, the method further comprises: when the deduplication policy indicates deduplication to be controlled by both of the AP and the data owner, transmitting in the data package a first cipherkey (CK) and a second CK being not equal to each other, the first and second CKs being generated by separating a data encryption key (DEK) into a first DEK and a second DEK and encrypting the first and second DEKs respectively, the DEK being used for encrypting the data to obtain the CT; when the deduplication policy indicates deduplication to be controlled by either of the AP or the data owner, transmitting in the data package the first and second CKs being equal to each other; when the deduplication policy indicates deduplication to be controlled by only the AP or only the data owner, transmitting in the data package only the first CK or only the second CK; and when the deduplication policy indicates deduplication to be controlled by none of the AP and the data owner, transmitting the plaintext in the data package.

According to another aspect of the disclosure, the first DEK is encrypted with a public key of the AP according to a proxy re-encryption (PRE) scheme; and wherein the second DEK is encrypted based on an access policy, the access policy containing user identities (IDs) of users eligible for holding the data.

According to another aspect of the disclosure, the deduplication request for the data contains a user ID information; wherein issuing the attribute secret key for conducting deduplication comprises: verifying whether the user ID information represents a user eligible for holding the data; and in response to a positive verification result, generating the attribute secret key based on the user ID information.

According to another aspect of the disclosure, the method further comprises: receiving a re-encrypted first CK for the second data from the data center; decrypting the re-encrypted first CK with a private key of the user device to obtain the first DEK; receiving an attribute secret key from an owner of the second data, and receiving the second CK for the second data from the owner of the second data or the data center; decrypting the second CK with the attribute secret key to obtain the second DEK; combining the first and second DEKs to obtain the DEK for deduplication.

According to another aspect of the disclosure, the method further comprises: transmitting at the user device, a request for deleting a data to the data center; in response to a request for a hash information corresponding to at least one index from the data center, transmitting a calculated hash information corresponding to the at least one index to the data center for verifying the holdership of the data; in response to a request to update the CT from the data center or at least one further data center, updating the CT according to a deduplication policy of the data.

According to another aspect of the disclosure, the method further comprises: when continuous deduplication control is needed, updating the CT according to an original deduplication policy of the data; and when no continuous deduplication control is needed, updating the CT according to a new deduplication policy, the new deduplication policy indicating deduplication to be controlled by only the AP.

According to another aspect of the disclosure, the method further comprises: transmitting a request for updating a CT of a data to the data center, wherein a deduplication policy for the data is contained in the request or can be determined according to the request, the deduplication policy indicating deduplication to be controlled by both or either of an authorized party (AP) and an owner of the data, or only the AP, or only the data owner or none; when the deduplication policy indicates that data owner deduplication control is needed, issuing an attribute secret key to an eligible data holder according to an attribute based encryption (ABE) scheme for conducting deduplication when the attribute secret key is not sent before.

According to another aspect of the disclosure, the method further comprises: receiving a re-encrypted updated first CK from the data center; decrypting the re-encrypted updated first CK with a private key of the user device to obtain the updated first DEK; receiving an attribute secret key from an owner of the data when it is not available, and receiving the updated second CK from the data center or the data owner; decrypting the updated second CK with the attribute secret key to obtain the updated second DEK; combining the updated first and second DEKs to obtain the updated DEK for deduplication.

According to another aspect of the disclosure, it is provided an apparatus comprising means configured to perform all steps of any one of the above described methods.

According to another aspect of the disclosure, it is provided an apparatus comprising: at least one processor; and at least one memory including computer-executable code, wherein the at least one memory and the computer-executable code are configured to, with the at least one processor, cause the apparatus to perform all steps of any one of the above described methods.

According to another aspect of the disclosure, it is provided a computer program product comprising at least one non-transitory computer-readable storage medium having computer-executable program code stored therein, the computer-executable code being configured to, when being executed, cause an apparatus to operate according to any one of the above described methods.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, in the context of cloud computing, various data are stored at cloud, e.g., sensitive personal information, personal data, publicly shared data, limited shared data with a group of people and so on. Some crucial data should be protected at the cloud against any access from unauthorized parties and even cloud service provider (CSP), some are not necessary. Further, Duplicated data may be stored at the cloud by the same users or different users, especially for shared data, in the same CSP or cross CSPs. The same data may be stored in the format of either plaintext or ciphertext (encrypted using different keys known by different data holders). Duplicated data storage greatly wastes storage resources, unnecessarily consumes power energy, increases operation cost of cloud service providers, and complicates data management at the cloud (e.g., searching data may become complicated).

On the other hand, data owners or holders may not trust CSP fully to handle their data. They sometimes would like to manage data by themselves regarding access, storage and usage (as one part of digital rights management). But due to complexity and availability, it may not be convenient for them to manage their data always or personally manage the data with low cruciality. In addition, from the compatibility point of view, it is highly expected that data deduplication can cooperate well with other data access control mechanisms. That is, the same data (either in encryption status or not) is only saved once at the cloud, but can be accessed by different users based on the policies of data owners and data holders (i.e., eligible data users who hold original data).

The embodiments of the present disclosure can provide a holistic and heterogeneous method for securely managing data storage in cloud computing to flexibly support data deduplication controlled by either data owner or a trusted third party or both or none in order to satisfy the demand on data security and privacy and at the same time save storage spaces in various data storage scenarios. Hereinafter, the embodiments of the present disclosure will be described with reference to FIGS. 1-12.

Figure 1:
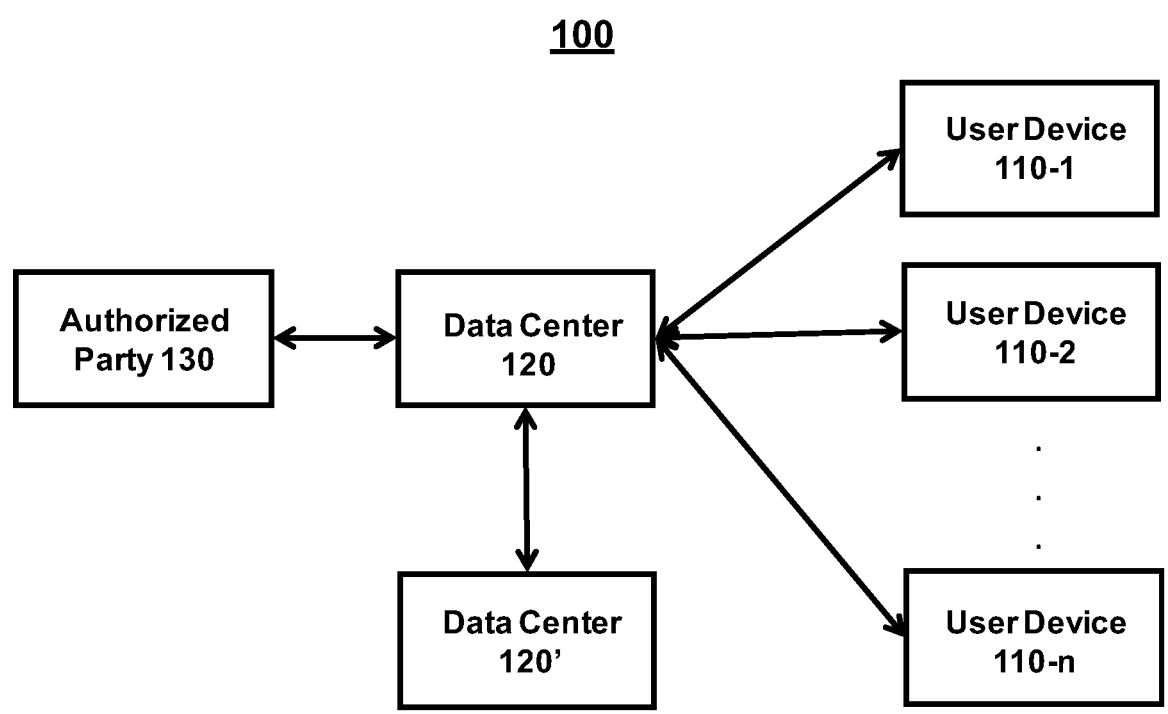
FIG. 1 shows an exemplary system in which at least one embodiment of the present disclosure may be implemented.

FIG. 1 shows an exemplary system in which at least one embodiment of the present disclosure may be implemented. As shown, the system 100 may comprise a plurality of user devices 110-1~110-n, data centers 120 and 120', and an authorized party (AP) 130. For any one of the user devices 110-1~110-n, it may enable its user to upload and save data at the data center 120 or 120'. When the data is not crucial, the data may be uploaded and saved in a format of plaintext, and when the data is crucial, the data may be uploaded and saved in a format of ciphertext. For example, the users of the user devices 110-1~110-n may hold the same one data, and at least one of these data holders may be an owner of the data. When a number of data holders save the same plain or encrypted data at the data center 120 or 120', data duplication may happen. The data owner may decide freely to allow data deduplication to be controlled by the data owner, or by the AP 130, or by both, or by none. The user device 110 may be any fixed or mobile device capable of conducting wired and/or wireless communication, such as a desktop computer, a laptop computer, a mobile phone, a tablet computer, a personal digital assistant (PDA), and so on.

The data center 120 or 120' may offer data storage services. When a number of data holders save the same plain or encrypted data at the data center 120 or 120', the data center 120 or 120' may conduct data deduplication by itself, or cooperate with the data owner and/or the AP 130 to conduct data deduplication. The data center 120 and 120' may cooperate under a business agreement to save storage space through deduplication. Although two data centers 120 and 120' are shown in FIG. 1, there may be more data centers in the system 100. The data center 120 and 120' may be provided for example by different CSPs (for example, a local CSP and a remote CSP). Alternatively, the data center 120 and 120' may be implemented through any other data storage technologies such as traditional file hosting service technology.

The AP 130 may manage the access to the data stored at the data center 120 or 120'. For example, the AP 130 may handle data deduplication on behalf of the data owner or cooperate with the data owner to conduct data deduplication via the data center 120 or 120'. The AP 130 may play as an access management center. The AP is a party that doesn't collude with any data centers and is trusted by the data holders to handle data deduplication. The AP may be for example a specially established organization.

The communication network by which the user devices 110-1~110-n, the data center 120 and 120', and the AP 130 communicate with each other may include wired and/or wireless networks. These network may include, but not limited to, a local area network (LAN), a metropolitan area network (MAN), a wide area network (WAN), a public data network (e.g., the Internet), a self-organized mobile network, or any other suitable packet-switched network, such as a commercially owned, proprietary packet-switched network, e.g., a proprietary cable or fiber-optic network. The wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), wireless local area network (WLAN), Long Term Evolution (LTE) networks, code division multiple access (CDMA), wideband code division multiple access (WCDMA), wireless fidelity (WiFi), satellite, mobile ad-hoc network (MANET), delay tolerant networks, and so on.

Figure 2:
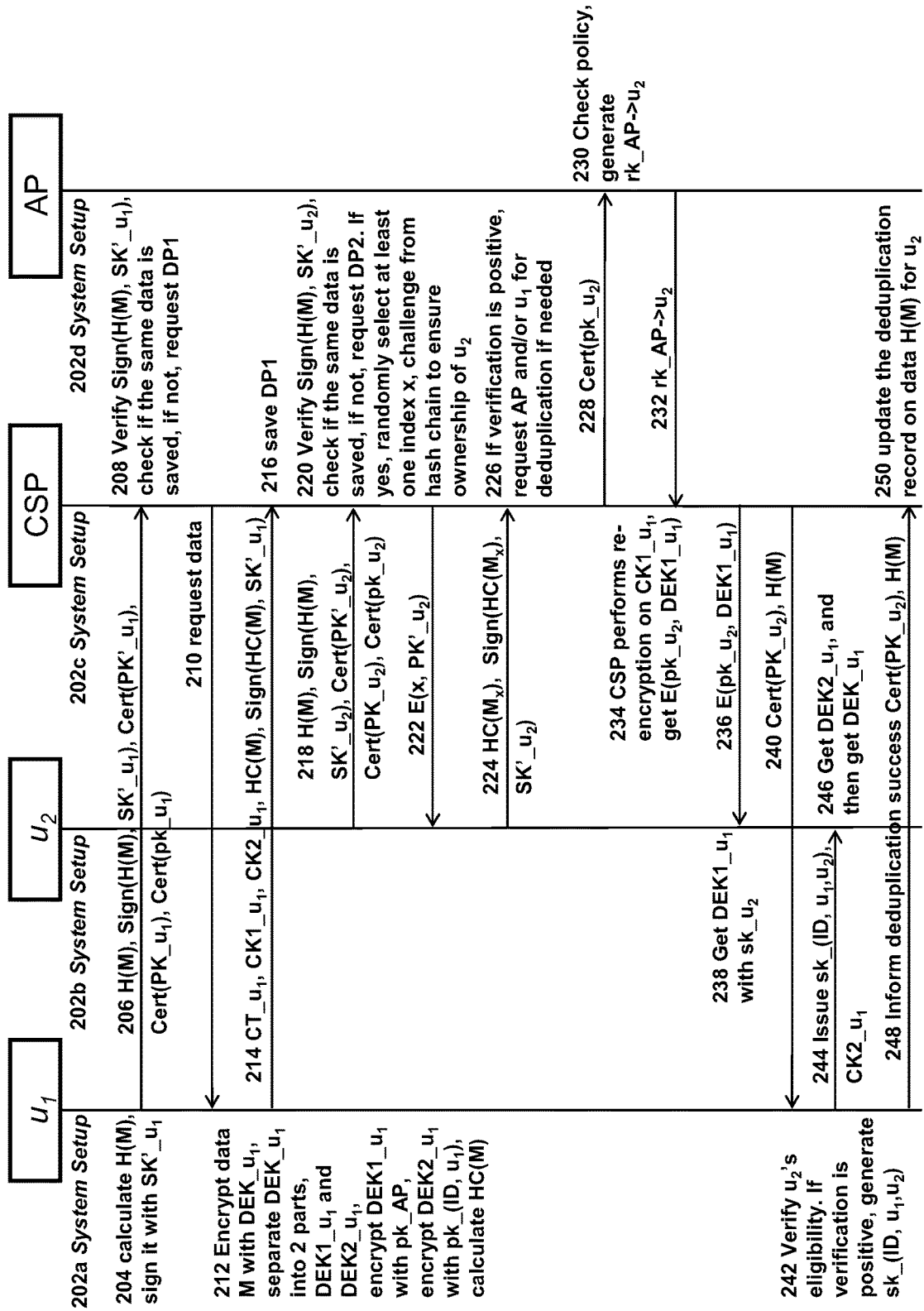
FIG. 2 depicts a flowchart of an overall system process for data deduplication with heterogeneous control according to an embodiment of the present disclosure.

FIG. 2 depicts a flowchart of an overall system process for data deduplication with heterogeneous control according to an embodiment of the present disclosure. It should be noted that although some embodiments of the present disclosure will be described hereinafter with reference to FIGS. 2-9 in which the data center is implemented through cloud storage technology, the present disclosure should not be so limited. As mentioned above, one skilled in the art can understand that the principle of the present disclosure can also be applied to a data center which is implemented through any other data storage technologies such as traditional file hosting service technology.

For better understanding the overall system process, the outline as well as related system keys and algorithms of an exemplary embodiment will be provided at first. It should be noted that for ease of understanding, a user (e.g., a data owner, or a data holder) mentioned hereinafter may denote the user's device.

In an exemplary embodiment of the present disclosure, the data owner may be allowed to set a data encryption key (DEK) to be a null value or a non-null value, for example according to different storage scenarios and/or deduplication policies. If the data owner doesn't want to control data access, the DEK may be set to have a null value. In this case, plaintext may be saved in a CSP, and the CSP may handle deduplication fully. On the other hand, if data access control is needed, the DEK may be set to have a non-null value. The non-null value may be a symmetric secret key. In this case, a ciphertext (CT) may be saved.

Then, the DEK may be separated into two parts, i.e. DEK1 and DEK2, for example according to different storage scenarios and/or deduplication policies. If the data owner would like to control data deduplication only by itself, the DEK1 may be null, and thus DEK2=DEK. In this case, an attribute-based encryption (ABE) scheme may be used.

In an ABE system, users may be identified by a set of attributes rather than an exact identity. Each data may be encrypted with an attribute-based access structure, such that only the users whose attributes satisfy the access structure can decrypt the data. ABE has developed into two branches, key-policy ABE (KP-ABE) and ciphertext-policy ABE (CP-ABE) depending on how attributes and policy are associated with ciphertexts and users' decryption keys. In CP-ABE, ciphertexts may be encrypted according to an access control policy which is formulated as a Boolean formula over the attributes. The construction assures that only a user whose attributes satisfy the access control policy is able to decrypt the ciphertext with its secret attribute key. In KP-ABE, a user's secret key may be associated with a set of attributes.

As an exemplary example, the DEK2 may be encrypted to obtain a cipherkey CK2, based on an access policy which contains eligible data holders' identities (ID). That is, an eligible data holder's ID is used as an attribute. In this way, the eligible data holder's attribute satisfies the access policy, and thus can decrypt the CK2.

Further, if the data owner would like to allow data deduplication to be only controlled by AP, the DEK2 may be null, and thus DEK1=DEK. In this case, a proxy re-encryption (PRE) scheme may be used. PRE enables a delegator to implement fine-grained policies with one key pair without any additional trust on a proxy. In a PRE system, a CT for a delegator may be generated with the delegator's public key, and the delegator may assign a re-encryption key to a proxy for an eligible data holder for data access, then the proxy may re-encrypt the CT with the re-encryption key, such that the re-encrypted CT can be decrypted with a secret key of an eligible data holder (i.e., delegatee).

As an exemplary example, the AP may act as a delegator, a CSP may act as a proxy, and an eligible data holder may act as a delegatee. The data owner may encrypt the DEK1 with the AP's public key to obtain a CK1, and transmit the CK1 to the CSP. The CSP may re-encrypt the CK1 with a re-encryption key assigned by the AP, and transmit the re-encrypted CK1 to an eligible data holder. In this way, the eligible data holder may decrypt the re-encrypted CK1 with its own delegatee secret key.

Further, if the data owner would like to control data deduplication by both the AP and the data owner, the DEK1 and the DEK2 may be both non-null. In this case, both ABE and PRE schemes may be used, and the DEK1 and DEK2 may be aggregated to obtain the DEK. Further, if the data owner would like to control data deduplication by either of the data owner or AP, DEK1=DEK2=DEK. In this case, deduplication may be conducted by contacting either the data owner or AP.

In this way, the present disclosure can propose two-dimensional storage management on cloud data deduplication by either data owner or an authorized party or both or neither of them. It can be applied into the scenario that cloud data deduplication can be handled by either the data owner or a third trusted party or both or none.

At the CSP side, a hash code of a duplicated data M may be used as its identifier, which is used to check duplication of data during data uploading and storage. The hash code of the data M, i.e. H(M) may be signed by the data owner or data holder for originality verification performed by the CSP. For example, the H(M) may be signed through public key cryptosystem (PKC). Meanwhile, a number of hash codes of randomly selected specific parts of the data M may be calculated with their indexes (e.g., the hash code of the first 20.1% of data, the hash code of 21-25% of data). These hash codes may be called as a hash chain HC(M) of the data M.

When a data owner/holder tries to store the data M at the CSP, it may send the signed hash code of the data M to the CSP for duplication check. If the duplication check result is positive, the CSP may further verify the ownership of the data holder by challenging the hash chain of the data M (e.g., some specific hash codes in the chain). If the ownership verification result is positive based on the hash chain verification, the CSP may contact the data owner and/or AP for deduplication based on the policy of the data owner for deduplication.

Data duplication check may be performed among CSPs. One CSP may save data for other CSPs. If a data holder tries to save the same data in another CSP, duplication check may be performed among CSPs based on their agreement. Duplicated data access from another CSP's eligible users may be supported by the CSPs.

The keys for use in an exemplary embodiment of the present disclosure are shown in the table below.

TABLE 1

| Key | Description | Usage |
|---|---|---|
| DEK_u | Symmetric key of a user u | Encryption of data of a user u |
| DEK$_1$_u | Part 1 of the symmetric key of a user u | |
| DEK$_2$_u | Part 2 of the symmetric key of a user u | |
| DEK'_u | Renewed symmetric key of a user u | Re-encryption of data of a user u |
| PK_u | Public key of a user u for ABE | An unique ID of a user u, and a key for verification of the user attributes, evaluation of user ID and personalized secret attribute key generation for the user u |
| SK_u | Secret key of a user u for ABE | Decryption in ABE |
| pk_(ID, u) | Public key of attribute ID generated by a user u | Encryption of the symmetric key DEK$_2$_u |
| sk_(ID, u, u') | Secret key of attribute ID for another user u' issued by a user u | Decryption of the symmetric key DEK$_2$_u |
| pk_u | Public key of a user u for PRE | Generation re-encryption key for a user u |
| sk_u | Secret key of a user u for PRE | Decryption |
| PK'_u | Public key of a user u for PKC | For PKC encryption, signature verification |
| SK'_u | Secret key of a user u for PKC | For PKC decryption, signature generation |

The usage of the above system keys will be described in detail in conjunction with the explanation of a number of fundamental algorithms for use in an exemplary embodiment.

InitiateNode(u).

The InitiateNode algorithm may be conducted at a user u at system setup, and take as input a node identity u, which is generally a unique node identity. The algorithm may output the following key pairs and certificates:

(1) A public user key PK_u and a secret user key SK_u for ABE.

Suppose the user u is a data owner, and the user u' is a data holder. For the user u', the public user key PK_u' may be used to issue a secret attribute key for the user u' (i.e. SK_(ID,u,u')) by calling the aftermentioned algorithm IssueIDSK(ID, SK_u, PK_u').

Each user may maintain a secret key SK_u that is used to issue secret attribute keys to other users based on other user's identity. It may also be used to generate its own public key of identity attribute (denoted as ID) of the user u-pk_(ID,u). The secret user key SK_u may also be used for decryption of a ciphertext encrypted by the PK_u.

(2) A key pair PK'_u and SK'_u for public key cryptosystem (PKC). The SK'_u may be used for conducting signature generation and for decrypting data that is encrypted with PK'_u. Accordingly, the PK'_u may be used for conducting signature verification and for encrypting data.

(3) A key pair pk_u and sk_u for PRE. As mentioned above, there may be three types of parties in a PRE system, i.e. a delegator, a proxy and a delegatee. As an exemplary example, a data holder may be a delegatee. Thus, the pk_u may also be referred to as a delegatee public key, and the sk_u may also be referred to as a delegatee secret key. (4) In addition, the PK_u, PK'_u and pk_u may be certified by an authorized third party (e.g., CA in PKI) or the CSP as Cert(PK_u), Cert(PK'_u) and Cert(pk_u). The Cert(PK_u), Cert(pk_u) and Cert(PK'_u) may be verified by the CSP and CSP users.

InitiateAP.

In the process of this algorithm, the AP may independently generate pk_AP and sk_AP for PRE, and broadcast the pk_AP through the CSP's storage service to CSP users. As an exemplary example, the AP may act as a delegator in a PRE system. Thus, the pk_AP may also be referred to as a delegator public key, and the sk_AP may also be referred to as a delegator secret key.

Encrypt(DEK_u, M).

The Encrypt algorithm may take as input the data M, the symmetric key DEK_u. The algorithm may encrypt the data M with the DEK_u, and output the ciphertext CT_u. This process may be conducted at the user u to protect its data stored at the CSP with the DEK_u.

SeparateKey(DEK_u).

When it is decided that both $DEK_1\_u$ and $DEK_2\_u$ are non-null, on input DEK_u, this function may output two parts of keys: $DEK_1\_u$ and $DEK_2\_u$ based on e.g., random separation.

CreateIDPK(ID, SK_u).

The CreateIDPK algorithm may be executed by the user u (i.e., the data owner) whenever the user u would like to control its data storage and access at the cloud. The algorithm may check whether the ID (e.g., PK_u) of the user u satisfies policies related to data storage management. For example, it may check whether the ID is an eligible ID of a data owner for managing storage and access of a data. If the ID satisfies the policies, the algorithm may output a public attribute key (denoted pk_(ID,u)) associated with the ID for the user u, according to an ABE mechanism. Otherwise, the algorithm may output NULL.

It should be noted that the representation of identity attribute is denoted as ID (note that ID can be an anonymous identifier). For every attribute with representation (ID, u), there is a public key, denoted pk_(ID,u), which is generated by the user u and is used to encrypt the symmetric key DEK2 that is a part of the DEK.

EncryptKey($DEK_2\_u$, A, pk_(ID,u)).

The EncryptKey algorithm may take as input the part 2 of the symmetric key $DEK_2\_u$, an access policy A and the public key pk_(ID,u) corresponding to the identity attribute occurring in policies related to data storage management. The algorithm may encrypt $DEK_2\_u$ with the policy A and output the cipherkey $CK_2\_u$. This process may be conducted at the user u to support deduplication of data storage at the CSP.

With respect to the access policy A, for example, a data owner would like other data holders with ID=PK_u_j' (j=1, 2, 3) to share its data storage. In this case, the policy A may be as follows: ID=PK_u'$_1$∨PK_u'$_2$∨PK_u'$_3$. The EncryptKey algorithm may iterate over all j=1, 2, 3, generate for each conjunction a random value R_j and constructs $CK_2\_j$. The cipherkey $CK_2$ may be obtained as a tuple $CK=<CK_{2\_1}, CK_{2\_2}, \ldots, CK_{2\_j}>$.

IssueIDSK(ID, SK_u, PK_u').

Before calling the IssueIDSK algorithm, the eligibility of the user u' may be checked by checking whether the Cert(PK_u') is a valid identifier certified by a third trusted party or the data owner itself. The Cert(PK_u') may be received by the user u from the user u' via the CSP, which will be described later with reference to FIG. 2.

Then, if the above check is positive, the IssueIDSK algorithm may be executed by the user u by firstly checking whether the user u' with a public key PK_u' is an eligible attribute ID (i.e., the PK_u' is an authorized party for holding the data). For example, it may check whether the PK_u' satisfies the access policy A.

If the above check result is positive, the IssueIDSK algorithm may output a secret attribute key SK_(ID,u,u') for the user u'. Otherwise, the algorithm may output NULL. The generated SK_(ID,u,u') may be sent to the user u' by the user u through a secure channel or using PKC.

It should be noted that the corresponding secret attribute keys for decrypting cipherkey encrypted by the pk_(ID, u) are personalized for eligible data holders and issued by the data owner u. To prevent collusion, every data holder gets a different secret attribute key that only it can use. A secret attribute key of the attribute ID, issued for an eligible holder u' by the user u is denoted as sk_(ID,u,u').

DecryptKey($CK_2\_u$, A, PK_u', sk_(ID,u,u')).

The DecryptKey algorithm may take as input a cipherkey produced by the EncryptKey algorithm, an access policy A under which $CK_2\_u$ was encrypted, and SK_u', sk_(ID,u,u') for the user u'. The DecryptKey algorithm may decrypt the cipherkey $CK_2\_u$ and output the corresponding plainkey $DEK_2\_u$ if the attributes (e.g., the PK_u') are sufficient to satisfy the access policy A. Otherwise, the algorithm may output NULL.

This process may be executed at the user u' if duplicated storage happens. It firstly checks whether the PK_u' satisfies the encryption policy A, and then conducts decryption to get $DEK_2\_u$ if the check result is positive.

As mentioned above, a PRE scheme can apply AP to support $DEK_1$ re-encryption. Proxy re-encryption may allow the CSP (i.e., the proxy) to transform a ciphertext of the $DEK_1$ computed under the AP's public key into one that can be decrypted using an eligible data holder's privacy key. During ciphertext transformation referred to as re-encryption, the CSP learns nothing about the underlying plaintext of the $DEK_1$, and thus cannot know the plain data of data holders. The algorithms about a PRE scheme are represented as below:

E(pk_AP, $DEK_1\_u$).

On input pk_AP and $DEK_1\_u$, the algorithm may output a ciphertext CK1=E(pk_AP, $DEK_1\_u$).

RG (pk_AP, sk_AP, pk_u').

On input (pk_AP, sk_AP, pk_u'), the re-encryption key generation algorithm, RG, may output a re-encryption key rk_AP→u' for the proxy CSP.

R(rk_AP→u',$CK_1$).

On input rk_AP→u' and the ciphertext $CK_1$, the re-encryption function, R, may output R(rk_AP→u',$CK_1$)=E(pk_u', $DEK_1\_u$)=$CK_1$', which can be decrypted using the private key sk_u'.

D(sk_u, $CK'_1$).

On input sk_u and the ciphertext $CK'_1$, the decryption algorithm D may output the plain key $DEK_1\_u$.

CombineKey($DEK_1\_u$, $DEK_2\_u$).

On input $DEK_1\_u$ and $DEK_2\_u$, this function may output the full key DEK_u through combination.

Decrypt(DEK_u, CT_u).

The Decrypt algorithm may take as input the encrypted data CT_u and the symmetric key DEK_u. The algorithm may decrypt the CT_u with the DEK_u and output the plain data M. This process is conducted at data holders to disclose the plain content of stored data at the CSP.

Now, an overall system process for data deduplication with heterogeneous control according to an embodiment of the present disclosure will be described with reference to FIG. 2. In this process, a user u1 is the real data owner and saves its sensitive personal data M at a CSP with protection using a DEK_u1, while a user u2 is a data holder who tries to save the same data at the CSP. Both the data owner and an AP are needed for deduplication control, and there is only one CSP in the system of FIG. 2.

In step 202, system setup may be conducted at each user, the CSP and the AP. For each user $u_i$, it may call InitiateNode $(u_i)$ to generate three key pairs (PK_$u_i$, SK_$u_i$), (PK'_$u_i$, SK'_$u_i$), (pk_$u_i$, sk_$u_i$) (i=1, 2, . . . ). Meanwhile, each user $u_i$ may get the corresponding certificates of its generated public keys Cert(PK_$u_i$), Cert(PK'_$u_i$) and Cert(pk_$u_i$) from an authorized third party (e.g., CA in PKI) or the CSP. For example, in step 202a, the user $u_1$ may generate three key pairs (PK_$u_1$, SK_$u_1$), (PK'_$u_1$, SK'_$u_1$), (pk_$u_1$, sk_$u_1$), and get the corresponding certificates of its generated public keys Cert(PK_$u_1$), Cert(PK'_$u_1$) and Cert(pk_$u_1$). As mentioned above, because the user $u_i$ is the data owner, the key pair for PRE, i.e. (pk_$u_1$, sk_$u_1$) and corresponding certificate Cert(pk_$u_1$) may also be omitted. In step 202b, the user $u_2$ may generate three key pairs (PK_$u_2$, SK_$u_2$), (PK'_$u_2$, SK'_$u_2$), (pk_$u_2$, sk_$u_2$), and get the corresponding certificates of its generated public keys Cert(PK_$u_2$), Cert(PK'_$u_2$) and Cert(pk_$u_2$).

For the AP, in step 202d, it may call InitiateAP to generate its key pair (pk_AP, sk_AP), and broadcast the pk_AP to each user. Further, for the CSP, in step 202c, it may receive respective public keys PK_$u_i$, PK'_$u_i$ and pk_$u_i$, and issue corresponding certificates Cert(PK_$u_i$), Cert(PK'_$u_i$) and Cert(pk_$u_i$) to each user $u_i$.

Then, in step 204, the user $u_1$ may generate hash information of the data M. the hash information may include at least a hash code of the data M. For example, the user $u_1$ may calculate H(M), and sign the H(M) with SK'_$u_1$ as Sign(H(M), SK'_$u_1$), where Sign( ) denotes a signature function.

Then, in step 206, the user $u_i$ may send at least the hash information of the data M. For example, the user $u_i$ may send a package $P_1$={H(M), Sign(H(M), SK'_$u_1$), Cert(PK_$u_1$), Cert(PK'_$u_1$), Cert(pk_$u_1$)} to the CSP. For another example, the package may contain at least H(M), Sign(H(M), SK'_$u_i$), and Cert(PK'_$u_i$) necessary for the check of data storage duplication.

Then, in step 208, the CSP may check whether the same data M has been saved at the CSP; if no same data has been saved at the CSP, the CSP may request the user $u_1$ to send the data; and if the same data has been saved at the CSP, the CSP may verify the ownership of the user $u_i$, which will be described in detail in the aftermentioned step 220. It should be noted that the steps 208 and 220 are substantially same. Because it is assumed that the first uploader is the real data owner, the CSP requests the user $u_i$ to upload the data in step 208.

For example, in step 208, the CSP may verify the certificate Cert(PK'_$u_i$), then verify the signature Sign(H(M), SK'_$u_1$) with the PK'_$u_1$, and then check if the same H(M) is recorded at the CSP. Because the user $u_1$ (i.e. the data owner) is assumed to be the first uploader, the CSP may request the data from the user $u_i$ in step 210.

Then, in step 212, the user $u_i$ may encrypt the data M with a DEK, separate the DEK into a DEK1 and a DEK2, encrypt the DEK1 according to a PRE scheme, and encrypt the DEK2 according to an ABE scheme, and calculate an index list and hash chain information of the data M.

For example, the user $u_i$ may encrypt the data M for privacy and security protection with a randomly selected symmetric key DEK_$u_1$ to get CT_$u_1$=Encrypt(DEK_$u_1$, M). The user $u_i$ may then call SeparateKey(DEK_$u_1$) to get two random parts of the DEK_$u_1$: DEK1_$u_1$ and DEK2_$u_1$. The user $u_1$ may encrypt the DEK2_$u_1$ with a pk_(ID, $u_1$) by calling EncryptKey(DEK2_$u_1$, A, pk_(ID,$u_1$)) to get CK1_$u_1$, where pk_(ID, $u_1$) is generated according to the data storage management policy of the user $u_1$, as mentioned above. The user $u_i$ may then encrypt DEK1_$u_1$ with a pk_AP to get CK_$1$_$u_1$ by calling E(pk_AP, DEK_$1$_$u_1$).

In addition, the user $u_1$ may randomly select an index list: IN={$In_1$, $In_2$, . . . , $In_k$} that indicates the special parts of M (e.g., $In_1$ indicates first 1% of the data; $In_2$ indicates first 1.2% of the data). Furthermore, the user $u_1$ may calculate the hash codes of respective partial M based on the indexes to get HC(M)={H($M_1$), H($M_2$), . . . , H($M_k$)}. The user $u_1$ may further sign the HC(M) with the SK'_$u_1$ to get Sign(HC(M), SK'_$u_1$).

Then, in step 214, the user $u_i$ may send the index list, the hash chain information, the encrypted data, the encrypted DEK1 and the encrypted DEK2. The hash chain information may include at least the hash chain of the data M. For example, the user $u_i$ may send the data package $DP_1$={CT_$u_1$, CK1_$u_1$, CK2_$u_1$, IN, HC(M), Sign(HC(M), SK'_$u_1$)} to the CSP through a secure channel. Then, in step 216, the CSP may store the data package.

Then, in step 218, the user $u_2$ may later on try to save the same data M at the CSP. Similarly to step 206, the user $u_2$ may send at least the hash information of the data M. For example, the user $u_2$ may send a package $P_2$={(M), Sign(H(M), SK'_$u_2$), Cert(PK_$u_2$), Cert(PK'_$u_2$), Cert(pk_$u_2$)} to the CSP. For another example, the package may contain at least H(M), Sign(H(M), SK'_$u_i$), and Cert(PK'_$u_i$) necessary for the check of data storage duplication.

Then, similarly to step 208, in step 220, the CSP may check whether the same data has been saved at the CSP; if no same data has been saved at the CSP, the CSP may request the user to send the data; and if the same data has been saved at the CSP, the CSP may verify the ownership of the user. Because the user $u_1$ has saved the same data at the CSP, the above check result is positive. In this case, the CSP may request the user $u_2$ to send hash information corresponding to at least one index from the index list. For example, the CSP may randomly select one index x or more than one index. The CSP may further encrypt the index x with the PK'_$u_2$ as E(x, PK'_$u_2$). Then, in step 222, the CSP may send the index information (e.g., E(x, PK'_$u_2$)) to the user $u_2$.

Then, in step 224, the user $u_2$ may calculate and send the corresponding hash information to the CSP. The corresponding hash information may include at least the hash information corresponding to the at least one index sent from the CSP. For example, the user $u_2$ may calculate a hash code HC($M_x$), where $M_x$ denotes the partial M corresponding to the at least one index x sent from the CSP. The user $u_2$ may further sign the HC($M_x$) with the SK'_$u_2$ as Sign(HC($M_x$), SK'_$u_2$). Then, the user $u_2$ may send the HC($M_x$) and the Sign(HC($M_x$), SK'_$u_2$) to the CSP. Note that more than one HC($M_x$) could be challenged by CSP at this step in order to ensure the holdership of the data.

Then, in step 226, the CSP may verify the hash information sent from the user $u_2$ based on the hash chain information that has been saved at the CSP by the user $u_1$; if the verification result is positive, the CSP may contact the AP and the user $u_1$ for deduplication. It should be noted that the AP and the user $u_1$ may be contacted simultaneously or sequentially without the order being limited, although it is shown in FIG. 2 that the CSP contact the AP first and then contact the user $u_1$.

For example, in step 226, the CSP may verify the Sign (HC($M_x$), SK'_$u_2$) with the PK'_$u_2$, and check whether the received HC($M_x$) is the same as the HC($M_x$) that has been saved at the CSP. If the check result is positive, the CSP may proceed to step 228. In step 228, the CSP may send the public key information for PRE of the user $u_2$ to the AP if it is not shared with AP before. For example, the CSP may send the certificate Cert(pk_$u_2$) (that contains the pk_$u_2$) to the AP.

Then, in step 230, the AP may verify the policy for data storage at a third party regarding the user $u_2$, and if the verification result is positive, the AP may generate re-encryption information for the user $u_2$ (if it is not available). For example, the policy for data storage at a third party regarding eligible data holders may be an access policy containing of public key information for PRE of eligible data holders, and may be generated by the data owner $u_1$ in step 212 and sent to the CSP in step 214 and sent to the AP in step 228, or sent to the AP in another secure way. Further, for example, the AP may generate a rk_AP→$u_2$ by calling RG(pk_AP, sk_AP, pk_$u_2$) (if it is not available). Then, in step 232, the AP may issue the re-encryption information to the CSP. For example, the AP may issue the rk_AP→$u_2$ to the CSP for example by using a secure channel.

Then, in step 234, the CSP may re-encrypt the CK1_$u_1$ with the re-encryption information. For example, the CSP may re-encrypt the CK1_$u_1$ by calling R(rk_AP→u2, E(pk_AP, DEK1_$u_1$))=E(pk_$u_2$, DEK1_$u_1$). Then, in step 236, the CSP may inform the re-encrypted CK1_$u_1$ (i.e. the E(pk_$u_2$, DEK1_$u_1$)) to the user $u_2$. About E(pk_$u_2$, DEK1_$u_1$), the user $u_2$ may send acknowledgement to the CSP. Then, in step 238, the user $u_2$ may decrypt the re-encrypted CK1_$u_1$ (i.e. the E(pk_$u_2$, DEK1_$u_1$)) with its secret key sk_$u_2$ (e.g., by callingD(sk_$u_2$, E(pk_$u_2$, DEK1_$u_1$)).

In step 240, the CSP may contact the data owner $u_i$ for deduplication. For example, the CSP may send the data identifier of the data M (e.g., the H(M)) and public key information for ABE of the user $u_2$ (e.g., the Cert(PK_$u_2$) which contains the PK_$u_2$) to the user $u_1$.

Then, in step 242, the user $u_1$ may verify the user $u_2$'s eligibility for data storage at a third party, and if the verification result is positive, the user $u_1$ may generate a personalized attribute secret key for the user $u_2$. For example, the user $u_i$ may verify the Cert(PK_$u_2$), and then generate a sk_(ID, $u_1,u_2$) by calling IssueIDSK(ID, SK_$u_1$, PK_$u_2$). As mentioned above, the IssueIDSK algorithm may check whether PK_$u_2$ is an eligible attribute ID.

Then, in step 244, the user $u_1$ may issue the personalized attribute secret key for the user $u_2$ and optionally the encrypted DEK2 to the user $u_2$. For example, the user $u_1$ may issue the sk_(ID, $u_1,u_2$) and optionally the CK2_$u_1$ to the user $u_2$ (using a secure channel or PKC). It should be noted that in a case where the CK2_$u_1$ is shared by the CSP, the user $u_1$ may issue only the personalized attribute secret key for the user $u_2$.

Then, in step 246, the user $u_2$ may decrypt the encrypted DEK2 based on the personalized attribute secret key for the user $u_2$, and combine the obtained DEK2 and DEK1 to get the DEK. For example, the user $u_2$ may decrypt the CK2_$u_1$ by calling DecryptKey(CK_$2_u_1$, A, SK_$u_2$, sk_(ID,$u_1,u_2$)) to get the DEK2_$u_1$, and combine the DEK1_$u_1$ from step 238 and the DEK2_$u_1$ by calling CombineKey(DEK1_$u_1$, DEK2_$u_1$) to get the DEK_$u_1$. In this way, the user $u_2$ may decrypt the CT_$u_1$ with the obtained DEK_$u_1$ without saving duplicated data at the CSP.

In step 248, the user $u_i$ may inform the success of data deduplication to the CSP. For example, the user $u_i$ may send the Cert(PK_$u_2$) and the H(M) to the CSP. After getting this notification, the CSP may record the corresponding deduplication information (e.g., the Cert(PK_u2) and the H(M)) in its system in step 250. For example, the CSP may update the deduplication record on the hash information H(M) for the user $u_2$. At this moment, both users $u_1$ and $u_2$ can access the same data M saved at the CSP freely. The user $u_i$ may use the DEK_$u_i$ directly, and the user $u_2$ may obtain the DEK_$u_1$ in step 246.

Figure 3:
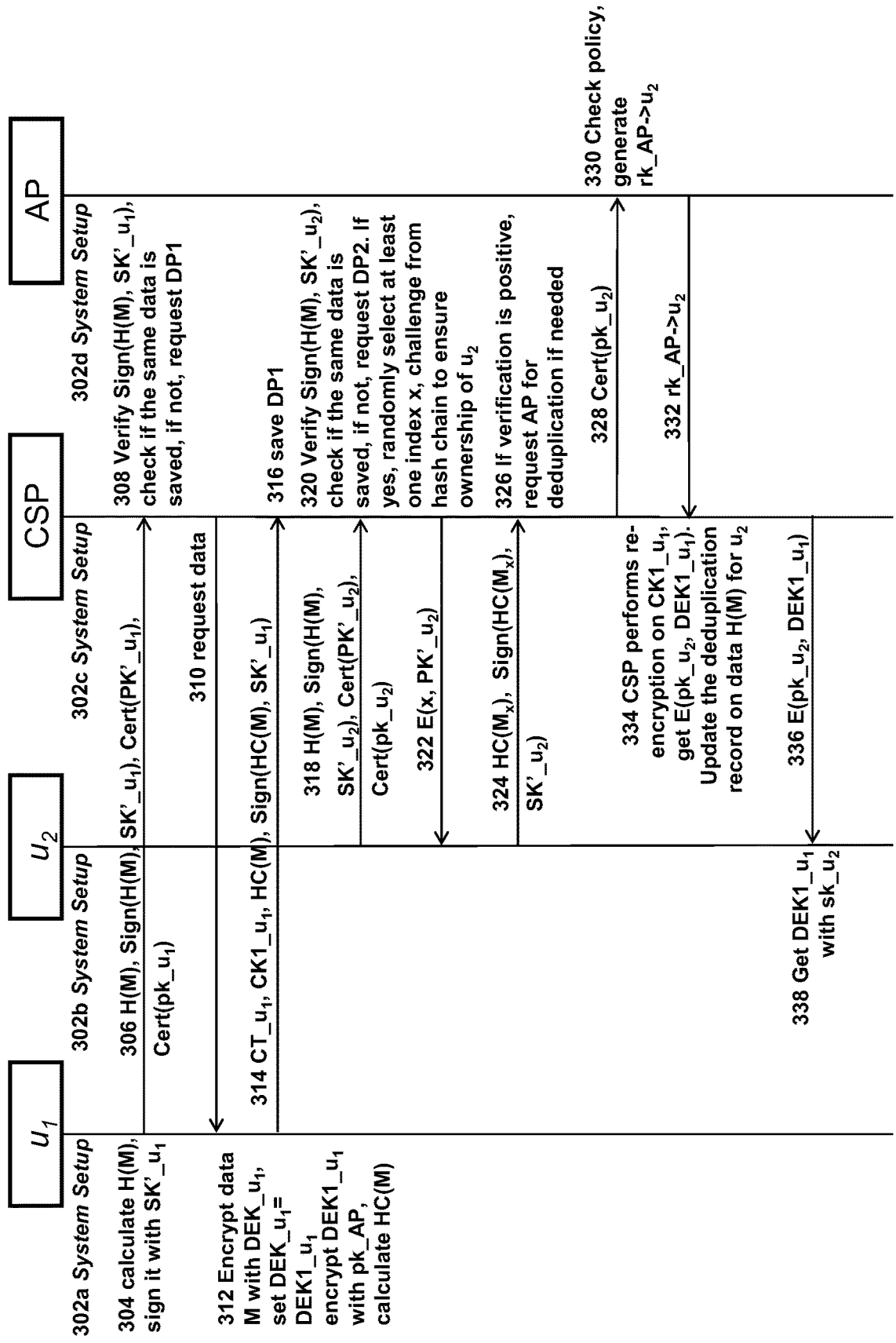
FIG. 3 depicts a flowchart of an overall system process for data deduplication with an authorized party's control according to an embodiment of the present disclosure.

FIG. 3 depicts a flowchart of an overall system process for data deduplication with an authorized party's control according to an embodiment of the present disclosure. The main difference between the two processes shown in FIGS. 2 and 3 lies in that the separation of the DEK is different. That is, in FIG. 2, DEK1+DEK2=DEK, where both the DEK1 and DEK2 are not null, and thus both the data owner and the AP are needed for deduplication control. In contrast, in FIG. 3, DEK2 is null, DEK1=DEK, which is not null. Thus, the deduplication is controlled by only the AP.

The details of the differences between the two processes shown in FIGS. 2 and 3 will be provided below. In steps 302a and 302b which are similar to steps 202a and 202b, the key pair (PK_$u_i$, SK_$u_i$) may be omitted since ABE control is not needed. Next, in step 312 which is similar to step 212, the DEK1 is set to be DEK, and only the DEK1 is encrypted according to a PRE scheme. Correspondingly, in step 314, the CK2 may be omitted. Further, the steps for deduplication based on ABE shown in FIG. 2 are omitted.

Figure 4:
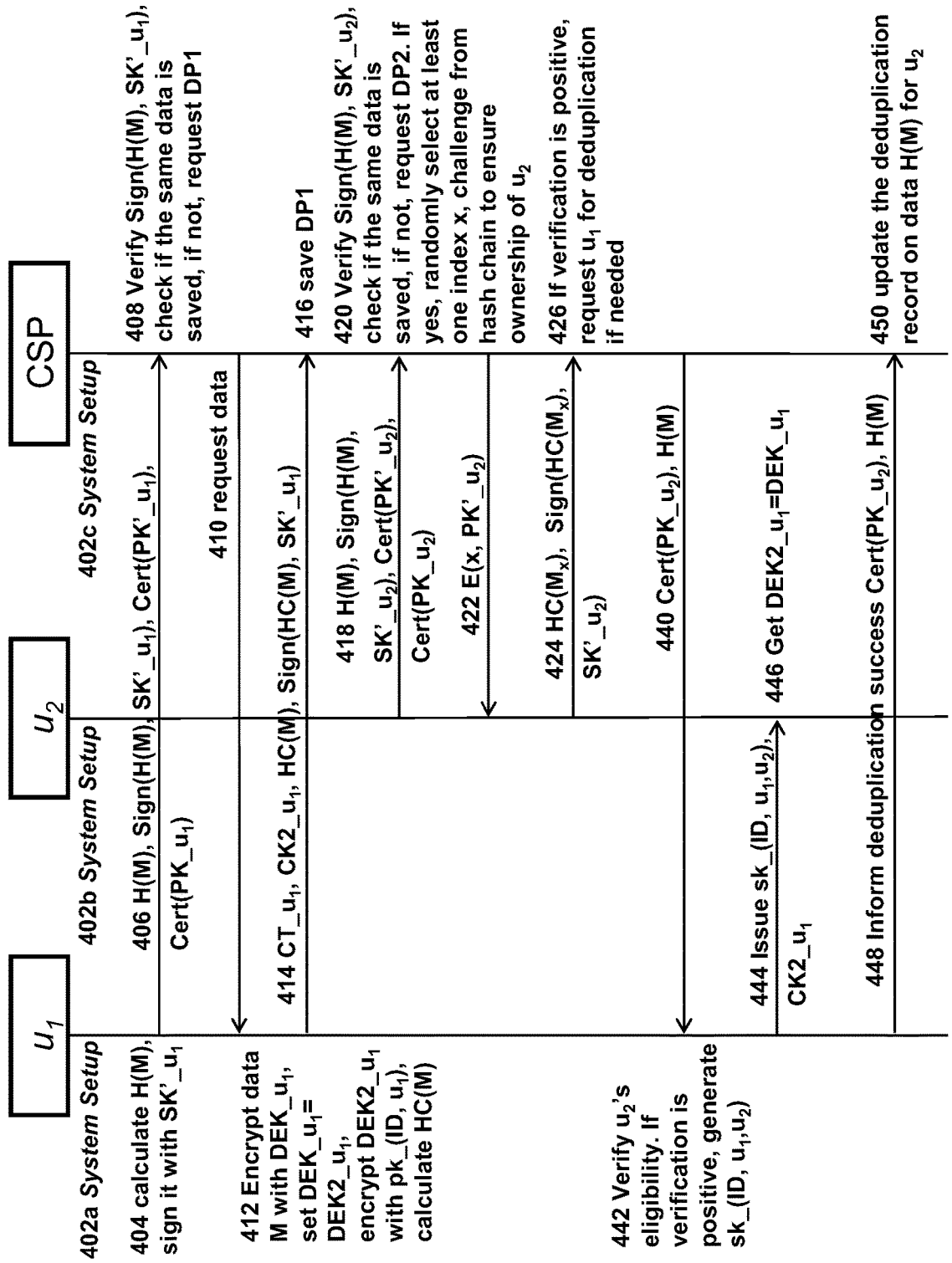
FIG. 4 depicts a flowchart of an overall system process for data deduplication with a data owner's control according to an embodiment of the present disclosure.

FIG. 4 depicts a flowchart of an overall system process for data deduplication with a data owner's control according to an embodiment of the present disclosure. The main difference between the two processes shown in FIGS. 2 and 4 lies in that the separation of the DEK is different. That is, in FIG. 2, DEK1+DEK2=DEK, where both the DEK1 and DEK2 are not null, and thus both the data owner and the AP are needed for deduplication control. In contrast, in FIG. 4, DEK1 is null, DEK2=DEK, which is not null. Thus, the deduplication is controlled by only the data owner.

The details of the differences between the two processes shown in FIGS. 2 and 4 will be provided below. In steps 402a and 402b which are similar to steps 202a and 202b, the key pair (pk_$u_i$, sk_$u_i$) may be omitted since PRE control is not needed. Besides, the step 402d may be omitted. Next, in step 412 which is similar to step 212, the DEK2 is set to be DEK, and only the DEK2 is encrypted according to an ABE scheme. Correspondingly, in step 414, the CK1 may be omitted. Further, the steps for deduplication based on PRE shown in FIG. 2 are omitted.

Figure 5:
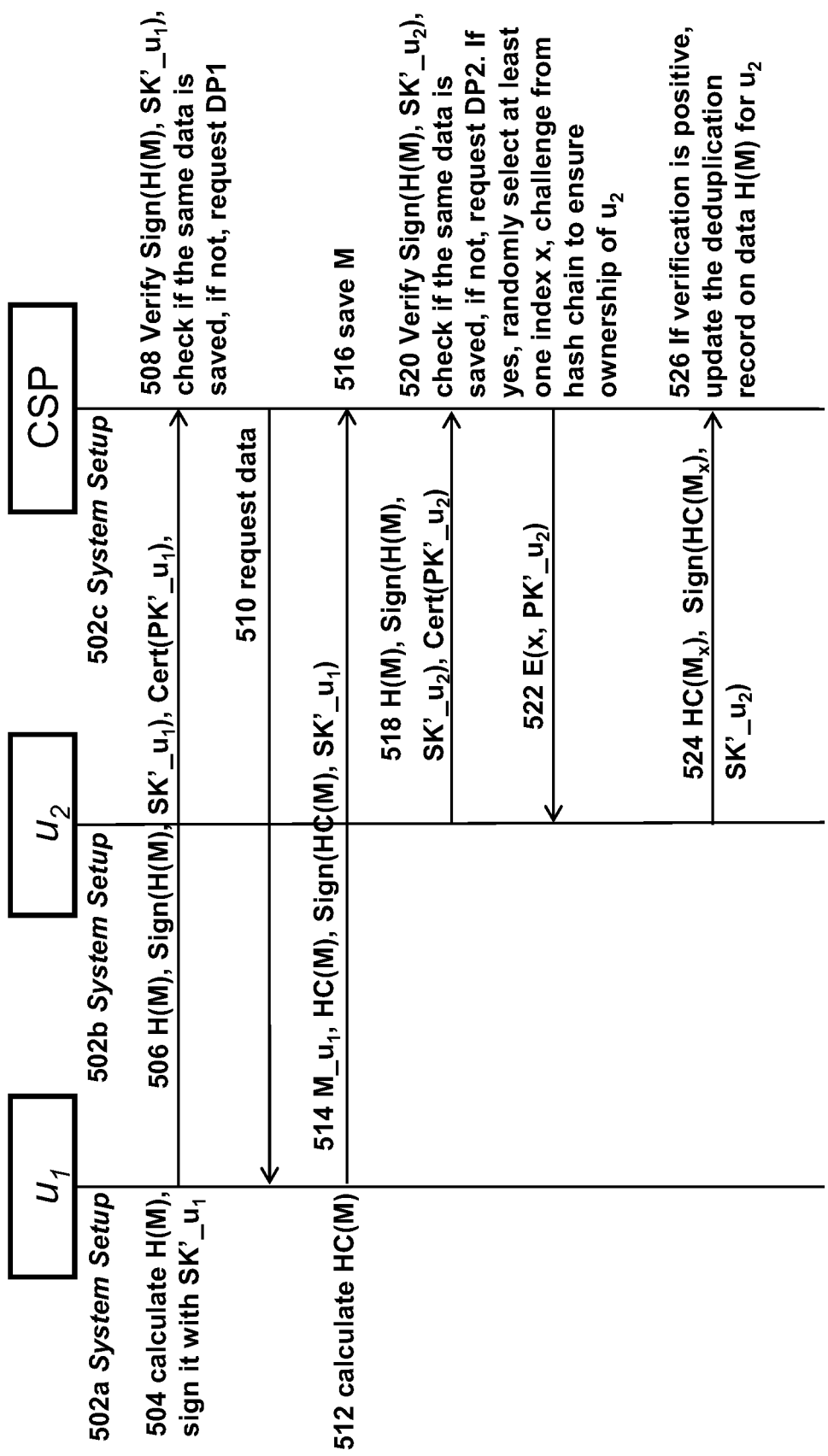
FIG. 5 depicts a flowchart of an overall system process for data deduplication without any control of an authorized party or a data owner according to an embodiment of the present disclosure.

FIG. 5 depicts a flowchart of an overall system process for data deduplication without any control of an authorized party or a data owner according to an embodiment of the present disclosure. In this case, DEK is null, and thus Plaintext is saved at the CSP.

In step 502, system setup may be conducted at each user and the CSP. For each user $u_i$, it may call InitiateNode($u_i$) to generate one key pair (PK'_$u_i$, SK'_$u_i$) (i=1, 2, . . . ). Meanwhile, each user $u_i$ may get the corresponding certificate of its generated public key Cert(PK'_$u_i$) from an authorized third party (e.g., CA in PKI) or the CSP. For example, in step 502a, the user $u_1$ may generate one key pair (PK'_$u_1$, SK'_$u_1$), and get the corresponding certificate of its generated public key Cert(PK'_$u_1$). In step 502b, the user $u_2$ may generate one key pair (PK'_$u_2$, SK'_$u_2$), and get the corresponding certificate of its generated public key Cert (PK'_$u_2$). For the CSP, in step 502c, it may receive the public key PK'_$u_i$, and issue corresponding certificate Cert(PK'_$u_i$) to each user $u_i$.

Then, in step 504, the user $u_i$ may generate hash information of the data M. the hash information may include at least a hash code of the data M. For example, the user $u_1$ may calculate H(M), and sign the H(M) with SK'_$u_1$ as Sign(H(M), SK'_$u_1$), where Sign( ) denotes a signature function.

Then, in step 506, the user $u_1$ may send at least the hash information of the data M. For example, the user $u_1$ may send a package $P_1$={H(M), Sign(H(M), SK'_$u_1$), Cert(PK'_$u_1$)} to the CSP.

Then, in step 508, the CSP may check whether the same data M has been saved at the CSP; if no same data has been saved at the CSP, the CSP may request the user $u_1$ to send the data; and if the same data has been saved at the CSP, the CSP may verify the ownership of the user $u_1$, which will be described in detail in the aftermentioned step 520. It should be noted that the steps 508 and 520 are substantially same. Because it is assumed that the first uploader is the data owner, the CSP requests the user $u_1$ to upload the data in step 508.

For example, in step 508, the CSP may verify the certificate Cert(PK'_$u_1$), then verify the signature Sign(H(M), SK'_$u_1$) with the PK'_$u_1$, and then check if the same H(M) is recorded at the CSP. Because the user $u_1$ (i.e. the data owner) is assumed to be the first uploader, the CSP may request the data from the user $u_1$ in step 510.

Then, in step 512, the user $u_1$ may calculate index list and hash chain information of the data M. For example, the user $u_1$ may randomly select an index list: IN={$In_1$, $In_2$, . . . , $In_k$} that indicates the special parts of M (e.g., $In_1$ indicates first 1% of the data; $In_2$ indicates first 1.2% of the data). Furthermore, the user $u_1$ may calculate the hash codes of respective partial M based on the indexes to get HC(M)={H($M_1$), H($M_2$), . . . , H($M_k$)}. The user $u_1$ may further sign the HC(M) with the SK'_$u_1$ to get Sign(HC(M), SK'_$u_1$).

Then, in step 514, the user $u_1$ may send at least the index list, the hash chain information and the data M. The hash chain information may include at least the hash chain of the data M. For example, the user $u_1$ may send the data package $DP_1$={M_$u_1$, IN, HC(M), Sign(HC(M), SK'_$u_1$)} to the CSP. Then, in step 516, the CSP may store the data package.

Then, in step 518, the user $u_2$ may later on try to save the same data M at the CSP. Similarly to step 506, the user $u_2$ may send at least the hash information of the data M. For example, the user $u_2$ may send a package P2={H(M), Sign(H(M), SK'_$u_2$), Cert(PK'_$u_2$)} to the CSP.

Then, similarly to step 508, in step 520, the CSP may check whether the same data M has been saved at the CSP; if no same data has been saved at the CSP, the CSP may request the user to send the data; and if the same data has been saved at the CSP, the CSP may verify the ownership of the user. Because the user $u_1$ has saved the same data at the CSP, the check result is positive. In this case, the CSP may request the user $u_2$ to send hash information corresponding to one index or more than one index from the index list. For example, the CSP may randomly select at least one index x. The CSP may further encrypt the at least one index x with the PK'_$u_2$ as E(x, PK'_$u_2$). Then, in step 522, the CSP may send the index information (e.g., E(x, PK'_$u_2$)) to the user u2. Note that more than one HC($M_x$) could be challenged by CSP at this step in order to ensure the holdership of the data.

Then, in step 524, the user $u_2$ may calculate and send the corresponding hash information to the CSP. The corresponding hash information may include at least the hash code corresponding to the at least one index sent from the CSP. For example, the user $u_2$ may calculate a hash code HC($M_x$), where $M_x$ denotes the partial M corresponding to the at least one index x sent from the CSP. The user $u_2$ may further sign the HC($M_x$) with the SK'_$u_2$ as Sign(HC($M_x$), SK'_$u_2$). Then, the user $u_2$ may send the HC($M_x$) and the Sign(HC($M_x$), SK'_$u_2$) to the CSP.

Then, in step 526, the CSP may verify the hash information sent from the user $u_2$ based on the hash chain information which has been saved at the CSP by the user $u_1$; if the verification result is positive, the CSP may update the deduplication record on the hash information H(M) for the user $u_2$. In this way, the user $u_2$ may access the data without saving duplicated data at the CSP.

It should be noted that although in the embodiments shown in FIGS. 2-5, the DEK2 is encrypted with the access policy (i.e., a CP-ABE scheme is used), the present disclosure is not so limited. For example, KP-ABE may also be used in the embodiments of the present disclosure.

Figure 6:
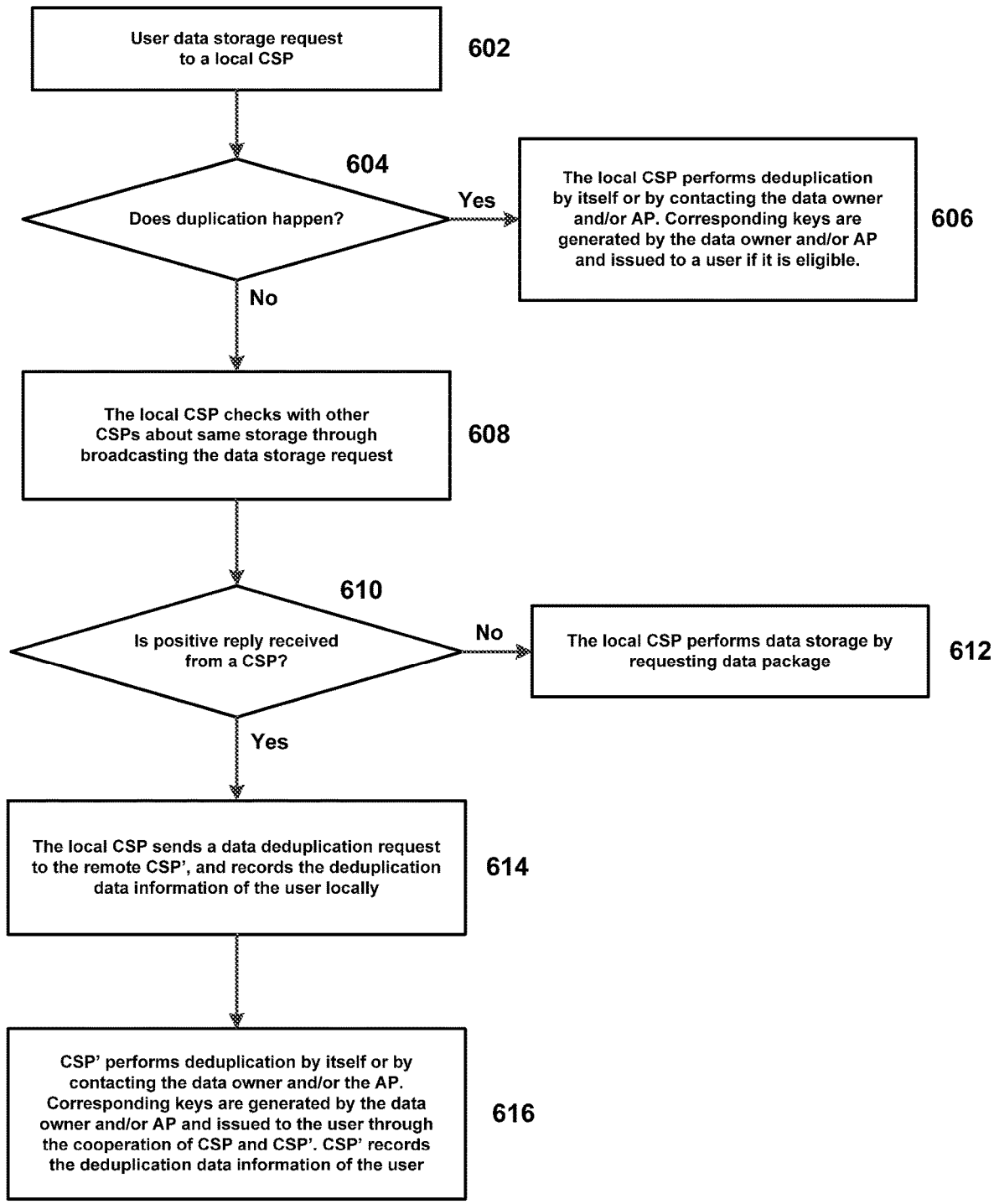
FIG. 6 shows a flowchart of a process for data deduplication through multiple cloud service providers' cooperation according to an embodiment of the present disclosure.

FIG. 6 shows a flowchart of a process for data deduplication through multiple CSPs' cooperation according to an embodiment of the present disclosure. In step 602, a user may request its local CSP for data storage. For example, the process of step 602 may be similar to the process of steps 204 (or 304, 404, 504) and 206 (or 306, 406, 506).

Then, in step 604, the local CSP may check whether data duplication happens. If the check result in step 604 is positive, the local CSP may proceed to step 606 in which the local CSP may perform deduplication by itself or by contacting the data owner and/or the AP based on the policy of deduplication. For example, the policy of deduplication may be determined according to whether any CK is received from the data owner and what kind(s) of CK(s) is (are) received. If no CK is received, the CSP may conduct deduplication by itself. Otherwise, the CSP may contact the AP if the CK1 is received, and contact the data owner if the CK2 is received. Note that the present disclosure is not so limited. For another example, the policy of deduplication may also simply be transmitted in the data package in step 214 or 314 or 414 or 514, or may be transmitted to the CSP in another secure way. For further one example, the policy of deduplication may be pre-determined (e.g., according to an agreement between the user u1 and the CSP), and stored in advance in the system of the CSP.

The processes of steps 604 and 606 may be similar to the processes of steps (220, 222, 226, 228, 234, 236, 240 and 250), or steps (320, 322, 326, 328, 334 and 336), or steps (520, 522 and 526).

On the other hand, if the check result in step 604 is negative, the local CSP may proceed to step 608 in which the CSP may check with other CSPs if the same data is stored (for example through broadcasting the data storage request of the user). If there is no positive reply from other CSPs, the local CSP may perform data storage by requesting data package from the user in step 612. On the other hand, if there is a remote CSP' which replies that the same data has been stored in its storage system, the local CSP may record the user data deduplication information locally in step 614. Note that the local CSP may optionally send a deduplication request to the remote CSP' to trigger the deduplication. Then, in step 616, the remote CSP' may perform deduplication by itself or by contacting the data owner and/or the AP. In the case of contacting the data owner and/or the AP, corresponding keys may be generated by the data owner and/or AP and issued to the user through the cooperation of CSP and CSP' (for example, the CSP' may contact the user via the CSP). The process of step 616 may be similar to the processes of steps (220, 222, 226, 228, 234, 236, 240 and 250), or steps (320, 322, 326, 328, 334 and 336), or steps (520, 522 and 526), except that in step 616, the CSP' may directly proceed to challenge from the hash chain since the same data has been determined to be saved on the CSP' in step 610.

Figure 7:
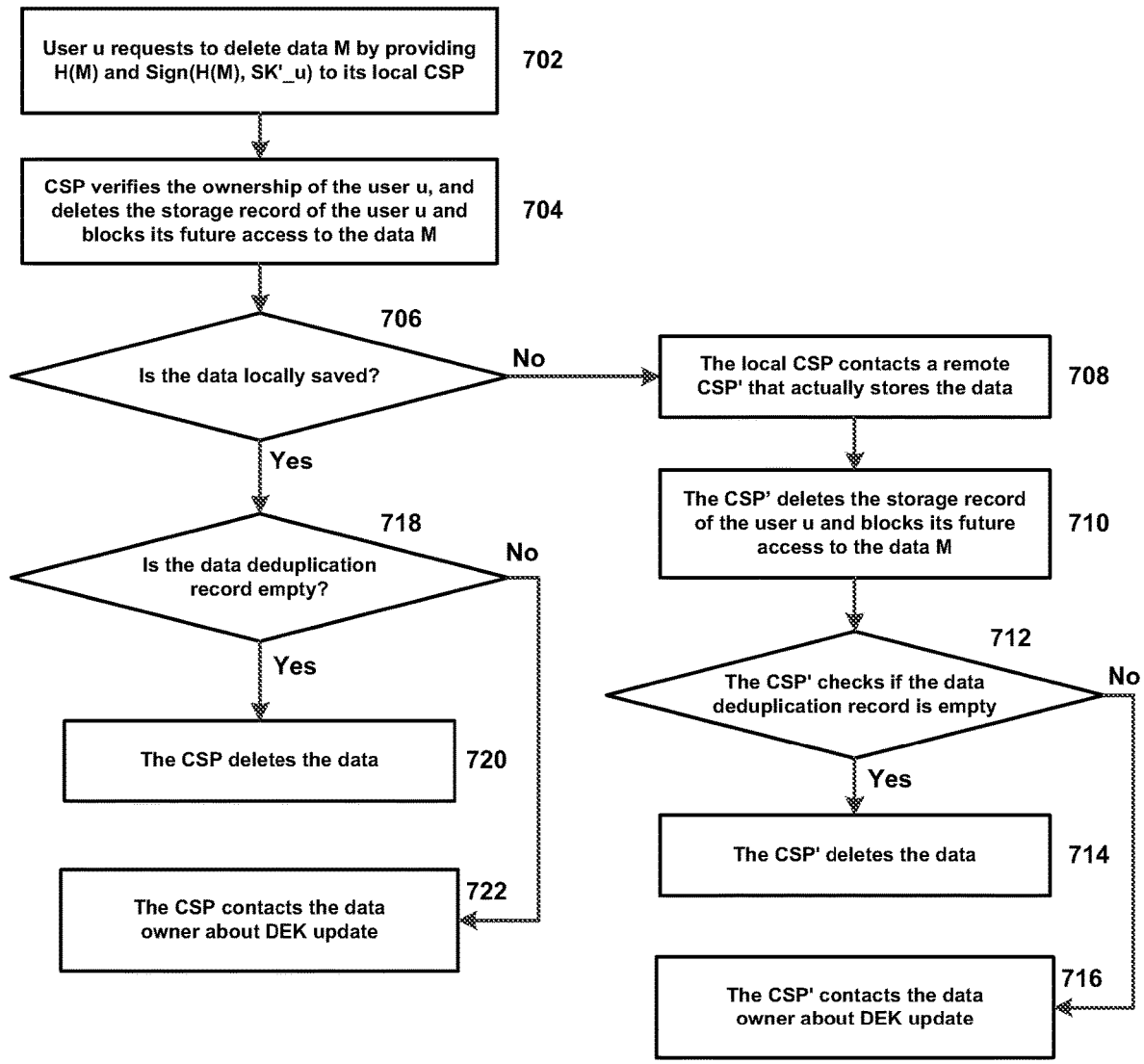
FIG. 7 shows a flowchart of a process for data deletion according to an embodiment of the present disclosure.

FIG. 7 shows a flowchart of a process for data deletion according to an embodiment of the present disclosure. In step 702, the user u may send a data deletion request to its local CSP. The data deletion request may include at least the hash information of the data M. For example the user u may send the H(M) and Sign(H(M), SK'_u) to the local CSP.

Then, in step 704, the CSP may verify the ownership of the user u, and if the verification result is positive, the CSP may delete the storage record of the user u and block its future access to the data M. The process for verifying the ownership of the user u may be similar to the process for verifying the ownership in steps (220, 222 and 226).

Then, in step 706, the CSP may check if the data is locally saved. If the check result is positive in step 706, the CSP may check whether the data deduplication record is empty (i.e., no user saves such data in the CSP any more) in step 718. If the check result in step 718 is positive, the CSP may delete the data. On the other hand, if the check result in step 718 is negative, the CSP may contact the data owner for conducting DEK update which will be described later with reference to FIG. 9. If the user u is the data owner, the CSP may inquire the user u whether to decide to continue deduplication control, as described below with reference to FIG. 8.

On the other hand, if the check result is negative in step 706, the local CSP may contact a remote CSP' that really stores the data in step 708. For example, the CSP may transfer the data deletion request to the CSP'. Then, in step 710, the CSP' may delete the storage record of the user u and block its future access to the data M. Then, similarly to step 718, in step 712, the CSP' may check if the data deduplication record is empty (i.e., no user saves such data in the CSP' any more). If the check result is positive in step 712, the CSP' may delete the data in step 714. On the other hand, if the check result is negative in step 712, the CSP' may contact the data owner in step 714 for conducting DEK update which will be described later with reference to FIG. 9. Likewise, if the user u is the data owner, the CSP' may also inquire the user u whether to decide to continue deduplication control, as described below with reference to FIG. 8.

Figure 8:
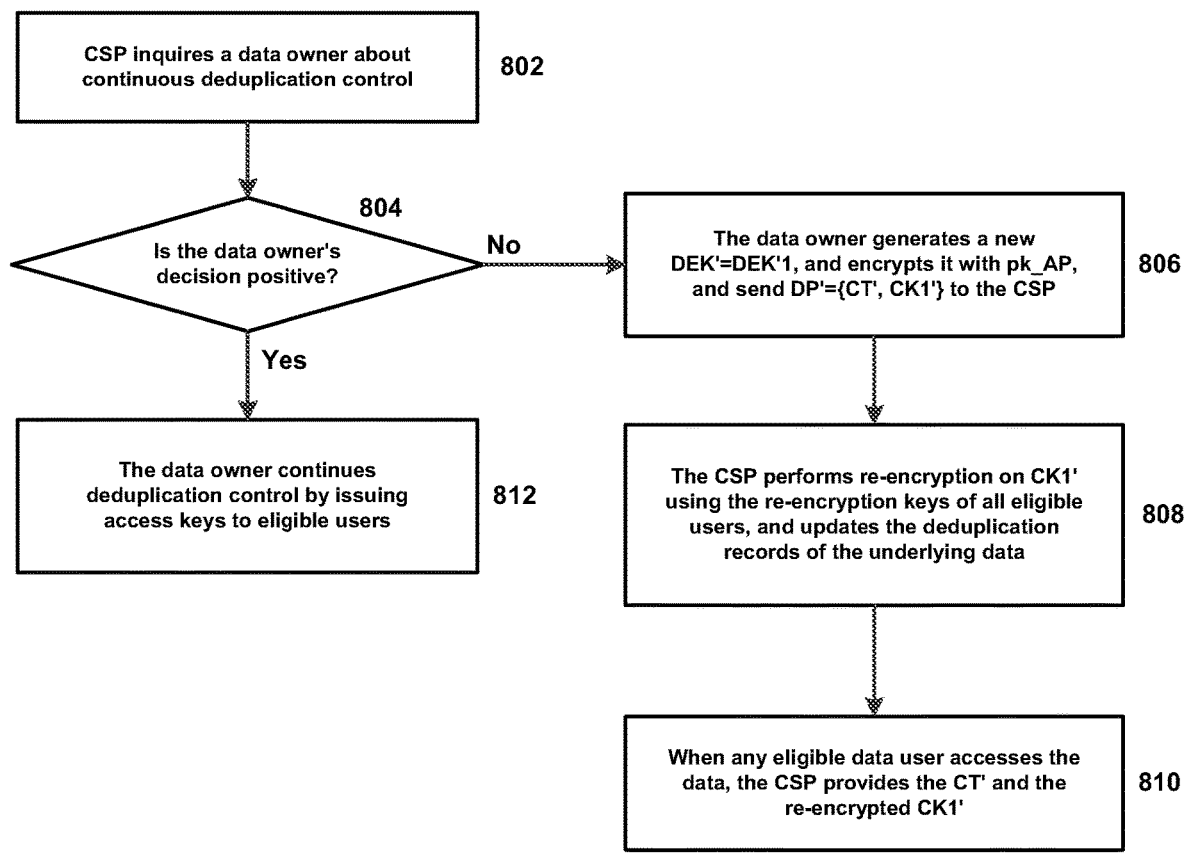
FIG. 8 shows a flowchart of a process for continuous data deduplication control according to an embodiment of the present disclosure.

FIG. 8 shows a flowchart of a process for continuous data deduplication control according to an embodiment of the present disclosure. In this case, the data owner deletes its data at the CSP, but still there are other eligible data holders storing the same data at the CSP. Thus, the CSP inquires the data owner about continuous deduplication control.

In step 802, the CSP may inquire the data owner about continuous deduplication control. If the data owner's decision is positive in step 802, the data owner may continue deduplication control in step 812 for example by issuing access keys to eligible users. On the other hand, if the data owner's decision is negative in step 802, the data owner may transfer the deduplication control to the AP in step 806. For example, the data owner may generates a new DEK'=DEK'1, and encrypt it with pk_AP, and then send DP'={CT', CK1'} to the CSP. The CSP may perform re-encryption on CK1' using the re-encryption keys of all eligible users, and update the deduplication record of the underlying data in step 808. When any eligible data user accesses the data, CSP may provide the CT' and the re-encrypted CK1' to the eligible data user in step 810.

It should be noted that FIG. 8 only illustrates one solution of continuous deduplication control. The present disclosure is not limited thereto. For example, other data holders may also take over the deduplication control. In this case, CSP may request a new delegate from existing data holders, or select one of them (e.g., based on the duration of data storage and/or user willingness). The new delegate will generate a new DEK' and perform storage update by applying the new DEK'. This process is similar to the DEK update as described below with reference to FIG. 9.

Figure 9:
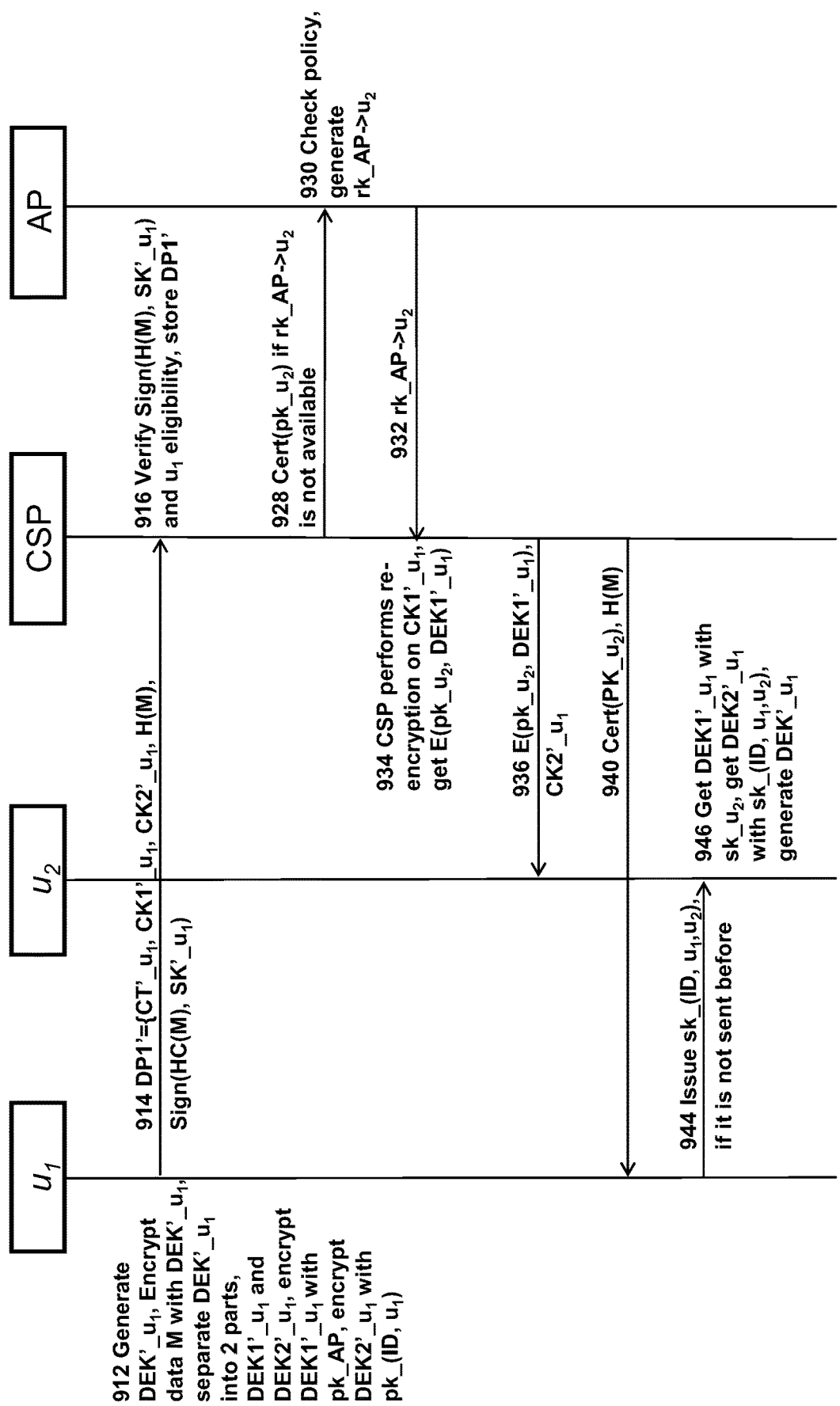
FIG. 9 shows a flowchart of an overall system process for updating data encryption key and ciphertext according to an embodiment of the present disclosure.

FIG. 9 shows a flowchart of an overall system process for updating data encryption key and ciphertext according to an embodiment of the present disclosure. In step 912, the data owner (or an eligible data holder) $u_1$ may generate a new data encryption key DEK', encrypt the data M with the DEK', separate the DEK' into a DEK1' and a DEK2', encrypt the DEK1' according to a PRE scheme, and encrypt the DEK2' according to an ABE scheme. For example, the user $u_1$ may encrypt the data M with a new symmetric key DEK'_$u_1$ to get CT'_$u_1$=Encrypt(DEK'_$u_1$, M). The user $u_1$ may then call SeparateKey(DEK'_$u_1$) to get two random parts of DEK'_$u_1$: DEK1'_$u_1$ and DEK2'_$u_1$. The user $u_1$ may encrypt the DEK2'_$u_1$ with the pk_(ID, $u_1$) by calling EncryptKey(DEK2'_$u_1$, A, pk_(ID,$u_1$)) to get CK2'_$u_1$. The user $u_1$ may then encrypt DEK1'_$u_1$ with the pk_AP to get CK1'_$u_1$ by calling E(pk_AP, DEK1'_$u_1$).

Then, in step 914, the user $u_1$ may send the hash and/or hash chain information, the newly encrypted data, the newly encrypted DEK1 and the newly encrypted DEK2. The hash or hash chain information may include at least the hash code or hash chain of the data M. For example, the user $u_1$ may send a data package DP$_1$'={CT'_$u_1$, CK1'_$u_1$, CK2'_$u_1$, H(M) and/or HC(M), Sign(H(M), SK'_$u_1$) and/or Sign(HC(M), SK'_$u_1$)} to the CSP. Then, in step 916, the CSP may validate the eligibility of the user $u_1$ and store the DP1'. For example, the CSP may verify the Sign(H(M), SK'_$u_1$) and/or Sign(HC(M), SK'_$u_1$) with the PK'_$u_1$ to validate the eligibility of the user $u_1$.

Then, in step 928, the CSP may send the public key information for PRE of any eligible data holders (e.g., the user $u_2$) to the AP if rk_AP→$u_2$ is not available. For example, the CSP may send the certificate Cert(pk_$u_2$) (that contains pk_$u_2$) to the AP.

Then, in step 930, the AP may verify the policy for data storage at a third party regarding the user $u_2$, and if the verification result is positive, the AP may generate re-encryption information for the user $u_2$ (if it is not available). For example, the AP may generate a rk_AP→$u_2$ by calling RG(pk_AP, sk_AP, pk_$u_2$) (if it is not available). Then, in step 932, the AP may issue the re-encryption information to the CSP. For example, the AP may issue the rk_AP→$u_2$ to the CSP for example by using a secure channel.

Then, in step 934, the CSP may re-encrypt the CK1'_$u_1$ with the re-encryption information. For example, the CSP may re-encrypt the CK1'_$u_1$ by calling R(rk_AP→$u_2$, E(pk_AP, DEK1'_$u_1$))=E(pk_$u_2$, DEK1'_$u_1$). Then, in step 936, the CSP may inform the re-encrypted CK1' (i.e. the E(pk_$u_2$, DEK1'_$u_1$)) and the new encrypted DEK2' (i.e. CK2'_$u_1$) to the user $u_2$. About E(pk_$u_2$, DEK1'_$u_1$), the user $u_2$ may send acknowledgement to the CSP.

Then, in step 944, the user $u_1$ may issue the personalized attribute secret key for the user $u_2$ (if it is not sent before) to the user $u_2$. For example, the user $u_1$ may issue the sk_(ID, $u_1$,$u_2$) (if it is not sent before) to the user $u_2$ (using a secure channel or PKC).

Then, in step 946, the user $u_2$ may decrypt the CK2'_$u_1$ (from step 936) for example by calling DecryptKey(CK$_2$_$u_1$, A, SK_$u_2$, sk_(ID,$u_1$,$u_2$)) to get the DEK2'_$u_1$, decrypt the re-encrypted DEK1'_$u_1$ (i.e. the E(pk_$u_2$, DEK1'_$u_1$)) with its secret key sk_$u_2$ (e.g., by calling D(sk_$u_2$, E(pk_$u_2$, DEK1'_$u_1$)), and combine the DEK1'_$u_1$ and the DEK2'_$u_1$ by calling CombineKey(DEK1'_$u_1$, DEK2'_$u_1$) to get the DEK'_$u_1$. In this way, the user $u_2$ may access the newly encrypted data CT'_$u_1$ with the DEK'_$u_1$.

It should be noted that in the above described process, it is assumed that the data owner $u_1$ knows who has been issued the secret keys already, and thus there is no need for the CSP to inform the data owner of this information. However, in a case where the data owner lost this information, or the eligibility check is updated to limit old users to further access, or the data owner has not issued the secret keys on time, a CSP notification may be needed. In this case, in step 940, the CSP may send the data identifier of the data M (e.g., the H(M)) and the public key information for ABE of eligible data holders (e.g., the Cert(PK_$u_2$) which contains the PK_$u_2$) to the user $u_1$.

It should also be noted that FIG. 9 only illustrates one scenario where both data owner and AP deduplication control are needed. Similarly to FIGS. 3-4, by setting DEK1'=DEK' or DEK2'=DEK' and omitting the steps for the other deduplication control, the DEK update process for the scenario where only AP deduplication control is needed or the scenario where only data owner deduplication control is needed can be obtained.

Figure 10:
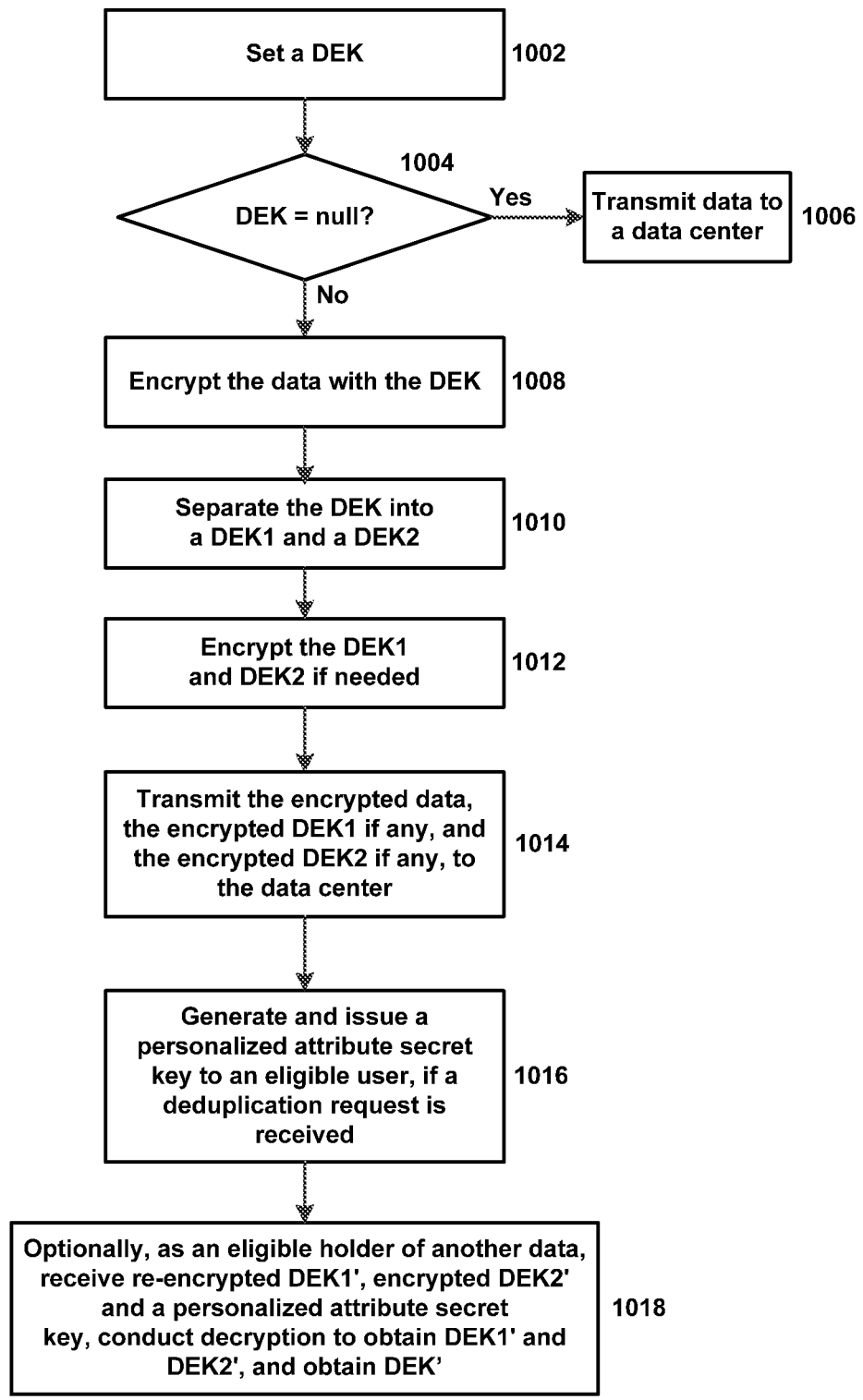
FIG. 10 shows a flowchart of a process for managing data storage in a user device according to an embodiment of the present disclosure.

FIG. 10 shows a flowchart of a process for managing data storage in a user device according to an embodiment of the present disclosure. The process may be executed by a user device to implement the functions of the present disclosure. Firstly, in step 1002, a DEK may be set to have a null value or a non-null value (for example, according to different storage scenarios and/or deduplication policies). Then, in step 1004, it may be determined whether the DEK has a null value. If it is determined in step 1004 that the DEK has a null value, a data may be transmitted to a data center in the communication network for storing the data in the data center. On the other hand, if it is determined in step 1004 that the DEK has a non-null value, the data may be encrypted with the DEK in step 1008.

Then, in step 1010, the DEK may be separated to a first DEK and a second DEK (for example, according to different storage scenarios and/or deduplication policies), where the first and second DEKs each has a null value or a non-null value. Then, in step 1012, the first DEK may be encrypted according to a proxy re-encryption (PRE) scheme if the first DEK has a non-null value, and the second DEK may be encrypted according to an attribute based encryption (ABE) scheme if the second DEK has a non-null value. Then, in step 1014, the encrypted data, the encrypted first DEK if any, and the encrypted second DEK if any, may be transmitted to the data center for storing them in the data center. The process of steps 1002-1014 may be similar to the process of steps (212, 214) or (312, 314) or (412, 414) or (512, 514).

Additionally, in a case where the DEK2 has a non-null value (i.e., data owner deduplication control is needed), a personalized attribute secret may be generated and issued to an eligible user in step 1016, if a deduplication request is received. The process of step 1016 may be similar to the process of steps (242, 244) or (442, 444).

Optionally, in step 1018, as an eligible holder of another data, a re-encrypted DEK1' for the another data, an encrypted DEK2' for the another data and a personalized attribute secret key may be received, decryption may be conducted to obtain DEK1' and DEK2', and the DEK1' and DEK2' may be combined to obtain DEK' for data deduplication. The process of step 1018 may be similar to the process of steps (238, 246) or 338 or 446.

Figure 11:
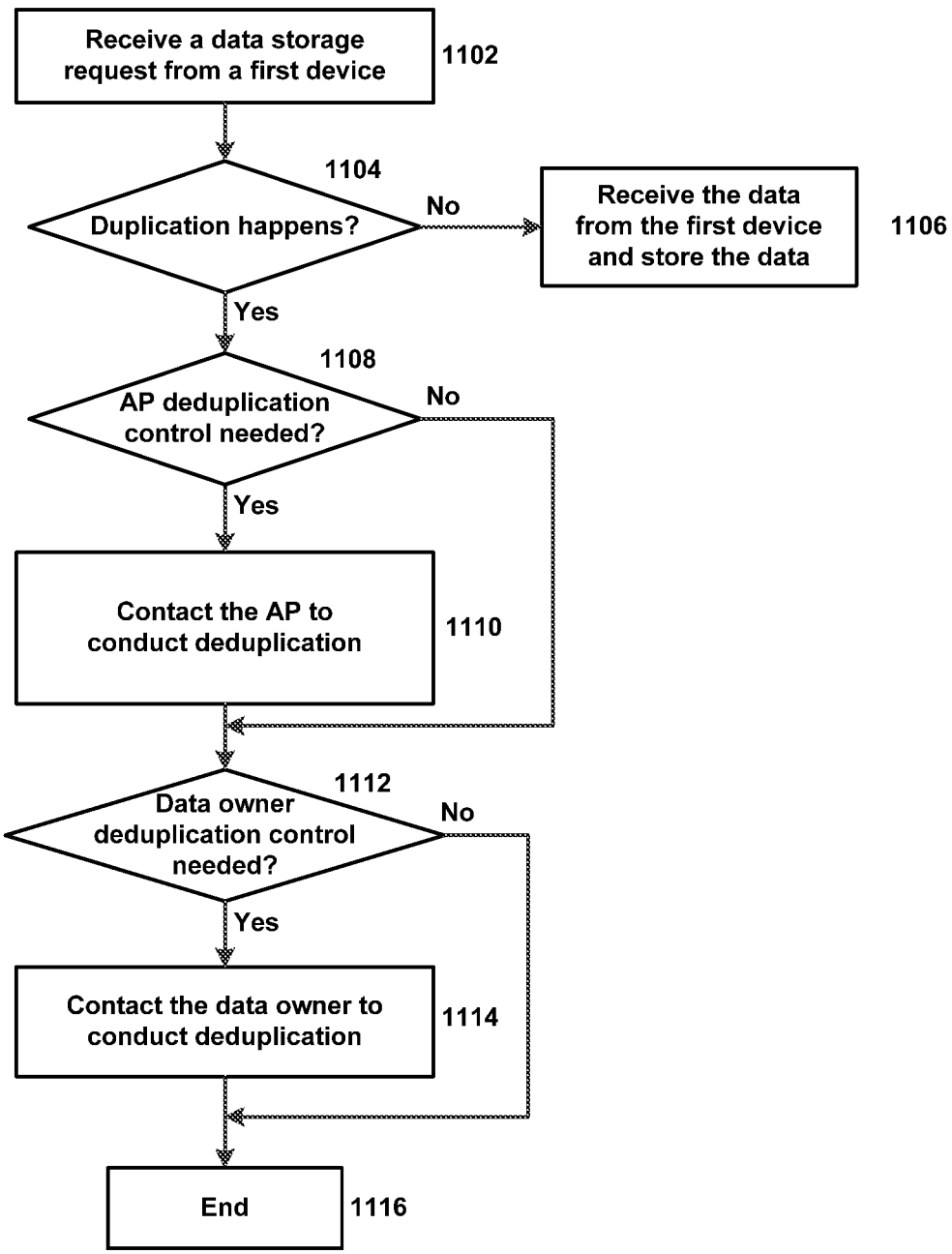
FIG. 11 shows a flowchart of a process for managing data storage in a communication network according to an embodiment of the present disclosure.

FIG. 11 shows a flowchart of a process for managing data storage in a communication network according to an embodiment of the present disclosure. The process may be executed by a data center to implement the functions of the present disclosure. Firstly, in step 1102, a data storage request may be received from a user. The process of step 1102 may be similar to the process of steps (206, 218) or (306, 318) or (406, 418) or (506, 518). Then, in step 1104, it may be determined whether the same data has been stored in the data center. If it is determined in step 1104 that no same data has been stored in the data center, an encrypted data, an encrypted first data encryption key (DEK) if any, and an encrypted second DEK if any, or the data may be received from a first device and stored in the data center, wherein the encrypted data is generated by encrypting the data with a DEK, the DEK is separated into the first DEK and the second DEK, the first DEK and the second DEK each has a null value or a non-null value, the encrypted first DEK is generated by encrypting the first DEK according to a proxy re-encryption (PRE) scheme, and the encrypted second DEK is generated by encrypting the second DEK according to an attribute based encryption (ABE) scheme in step 1106. The process of steps 1104 and 1106 may be similar to the process of steps (208, 210, 216) or (308, 310, 316) or (408, 410, 416) or (508, 510, 516).

On the other hand, if it is determined in step 1104 that the same data has been stored in the data center, it may determine whether AP deduplication control is needed (for example according to whether the encrypted first DEK exists in the data received from the first device) in step 1108. If it is determined in step 1108 that no AP deduplication control is needed, the process may proceed to step 1112. On the other hand, if it is determined in step 1108 that AP deduplication control is needed, an AP may be contacted to conduct deduplication according to a PRE scheme. The process of steps 1108 and 1110 may be similar to the process of steps (228, 232, 234, 236) or (328, 332, 334, 336). In step 228 or 328, because it is determined that AP deduplication control is needed (for example according to the fact that the encrypted first DEK exists in the data received from the first device), the AP may be contacted to conduct deduplication. In step 232 or 332, a re-encryption key may be received from the AP. In step 234 or 334, the encrypted first DEK may be re-encrypted with the re-encryption key. In step 236 or 336, the re-encrypted first DEK may be issued to an eligible data holder.

Then, in step 1112, it may be determined whether data owner deduplication control is needed (for example according whether the encrypted second DEK exists in the data received from the first device). If it is determined in step 1112 that no data owner deduplication control is needed, the process may end in step 1116. On the other hand, if it is determined in step 1112 that data owner deduplication control is needed, a data owner may be contacted to conduct deduplication according to an ABE scheme in step 1114. The process of steps 1112 and 1114 may be similar to step 240 or 440. Then, the process may end in step 1116.

Based on the above description, the following advantageous technical effects can be achieved in the present disclosure:

(1) Scalability: The present disclosure can support a large volume of duplicated data storage happened at one CSP, as well as a number of CSPs. Duplication check and deduplication can be handled among a number of CSPs in order to save each one's storage space.

(2) Flexibility: The present disclosure can cooperate with other data access control mechanisms handled by the data owner by introducing control attributes (access policies) into the DEK2 encryption with ABE through policy A update for supporting both deduplication and access control. In this way, it can support digital rights management based on the expectation of the data owner. In addition, it can also cooperate with centralized data access control mechanisms by involving access policies into the check for re-encryption key generation at an authorized party (AP) and/or CK1 re-encryption at CSP. Either distributed control or centralized control or both can be supported by the invention flexibly based on the data owner's willingness.

(3) Using ABE at the data owner and/or applying PRE at AP, it is easy to build a access policy tree that contains attributes (e.g., trust level and identifier) used for data access and deduplication, and involve policies into AP to allow it to delegate control for the purpose of access and deduplication.

(4) Low cost of storage: The present disclosure can obviously save the storage space for a number of CSPs. Only one copy of the same data is stored cross multiple CSPs. Storing deduplication records at each CSP may occupy some storage or memory. Additional duplication check and deduplication process may request some memory and processing cost. But this cost can be ignored comparing with the saving of a big volume of duplicated data storage.

(5) Security: The security of the present disclosure is ensured by ABE theory, PRE theory, symmetric key encryption and public PKC theory. Two-dimensional deduplication control can be more secure than one-dimensional deduplication control. In addition, we apply random hash chain check to further verify the validity of the ownership of the data. Additional management protocols can be applied to support data storage management at the same time for achieving deduplication.

Figure 12:
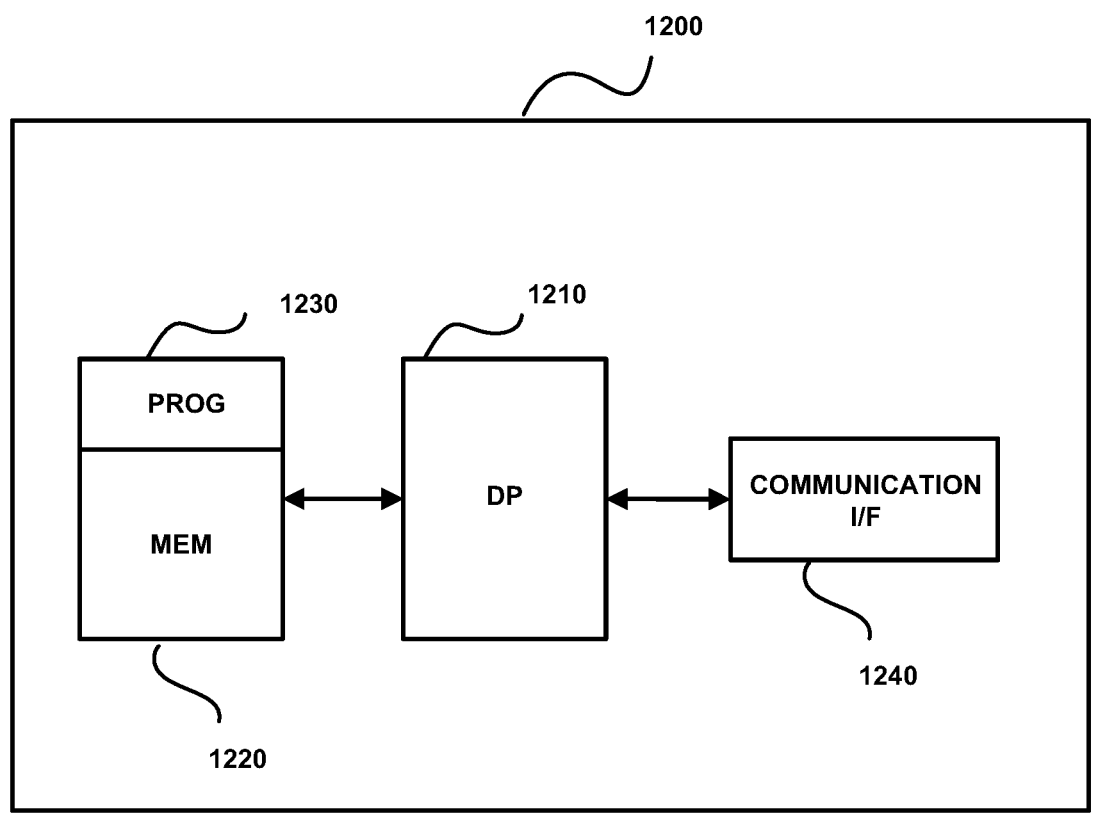
FIG. 12 is a simplified block diagram showing an apparatus that are suitable for use in practicing some exemplary embodiments of the present disclosure.

FIG. 12 is a simplified block diagram showing an apparatus that are suitable for use in practicing some exemplary embodiments of the present disclosure. For example, any one of the user devices 110, the data center 120 or 120' and the AP 130 shown in FIG. 1 may be implemented through the apparatus 1200. As shown, the apparatus 1200 may include a data processor (DP) 1210, a memory (MEM) 1220 that stores a program (PROG) 1230, and a communication interface 1240 for communicating data with other external devices through wired and/or wireless communication.

The PROG 1230 is assumed to include program instructions that, when executed by the DP 1210, enable the apparatus 1200 to operate in accordance with the exemplary embodiments of this disclosure, as discussed above. That is, the exemplary embodiments of this disclosure may be implemented at least in part by computer software executable by the DP 1210, or by hardware, or by a combination of software and hardware.

The MEM 1220 may be of any type suitable to the local technical environment and may be implemented using any suitable data storage technology, such as semiconductor based memory devices, flash memory, magnetic memory devices and systems, optical memory devices and systems, fixed memory and removable memory. The DP 1210 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An apparatus for managing data storage in a communication network, the apparatus comprising:
   at least one processor; and
   at least one memory including computer-executable code, wherein the at least one memory and the computer-executable code are configured to, with the at least one processor, cause the apparatus to:
   receive from a first device, a request for storing a data in the apparatus;
   check whether the same data has been stored in the apparatus;
   in response to a check result that no same data has been stored in the apparatus, receive from the first device a data package comprising at least the data in plaintext or ciphertext, and the data package further comprising an index list and a hash chain information;
   in response to a check result that the same data has been stored in the apparatus, obtain a deduplication policy for the data;

when the deduplication policy indicates deduplication to be controlled by both or either of an authorized party and an owner of the data, or only the authorized party, or only the data owner, contact both or either of the authorized party and the data owner, or only the authorized party, or only the data owner to conduct deduplication for the data, wherein the contacting comprises the apparatus being caused to request the first device to transmit a hash information corresponding to at least one index from the index list;

verify whether the first device holds the data based on the hash information from the first device corresponding to the requested at least one index; and in response to a positive verification result, contact to conduct deduplication or record a deduplication information of the data for the first device; and when the deduplication policy indicates deduplication to be controlled by none of the authorized party and the data owner, conduct deduplication for the data.

2. The apparatus according to claim 1, wherein the index list comprising a plurality of indexes each indicating a specific part of the data, the hash chain information comprising a plurality of hash information each corresponding to one index.

3. The apparatus according to claim 1, wherein the computer-executable code are further configured to, when executed by the at least one processor, cause the apparatus to:

read the deduplication policy stored in advance in the data center, or receive the deduplication policy from the data owner, or determine the deduplication policy according to the data package.

4. The apparatus according to claim 1, wherein the computer-executable code are further configured to, when executed by the at least one processor, cause the apparatus to:

when the data package further contains a first cipherkey and a second cipherkey being not equal to each other, determine deduplication to be controlled by both of the authorized party and the data owner, the first and second cipherkeys being generated by separating a data encryption key into a first data encryption key and a second data encryption key and encrypting the first and second data encryption keys respectively, the data encryption key being used for encrypting the data to obtain the ciphertext;

when the data package further contains the first and second cipherkeys being equal to each other, determine deduplication to be controlled by either of the authorized party or the data owner;

when the data package further contains only the first cipherkey or only the second cipherkey, determine deduplication to be controlled by only the authorized party or only the data owner; and when the data package contains no cipherkey, determine deduplication to be controlled by none of the authorized party and the data owner.

5. The apparatus according to claim 1, wherein the computer-executable code are further configured to, when executed by the at least one processor, cause the apparatus to:

receive a re-encryption key from the authorized party when the authorized party is not available;

re-encrypt the first cipherkey with the re-encryption key according to a proxy re-encryption scheme; and transmit the re-encrypted first cipherkey to the first device such that the first device can decrypt the re-encrypted first cipherkey with a secret key of the first device.

6. The apparatus according to claim 5, further comprising:

in response to a request for updating the ciphertext of a data, obtain the deduplication policy for the data;

when the deduplication policy indicates that authorized party deduplication control is needed, re-encrypt the updated first cipherkey with the re-encryption key according to a proxy re-encryption scheme; and transmit the re-encrypted updated first cipherkey to the first device such that the first device can decrypt the re-encrypted updated first cipherkey with a secret key of the first device;

when the deduplication policy indicates that a deduplication control by the data owner is needed, informing the data owner the data identifier and the public key information of the data holder when necessary according to a attribute based encryption scheme in order to allow the data owner to perform data deduplication by issuing a secret key to the first device that can decrypt the updated second cipherkey.

7. The apparatus according to claim 1, wherein the computer-executable code are further configured to, when executed by the at least one processor, cause the apparatus to:

transmit an attribute identity of the first device to the data owner such that the data owner can issue an attribute secret key for the first device when it is eligible to decrypt the second cipherkey according to an attribute based encryption scheme.

8. The apparatus according to claim 1, wherein the computer-executable code are further configured to, when executed by the at least one processor, cause the apparatus to:

in response to a check result that no same data has been stored in the apparatus, request at least one further data center to check whether the same data has been stored in it;

in response to a positive reply from the at least one further data center, record a deduplication information of the data for the first device, wherein the at least one further data center is able to conduct deduplication for the data;

in response to a negative reply from the at least one further data center, performing data storage accordingly.

9. The apparatus according to claim 1, wherein the computer-executable code are further configured to, when executed by the at least one processor, cause the apparatus to:

receive at the apparatus from a second device, a request for deleting a data;

check whether the data is stored in the apparatus by the second device;

in response to a positive check result, delete a record of storage of the data for the second device; delete the data when a deduplication record for the data is empty; and notify an owner of the data for updating the ciphertext when the deduplication record for the data is not empty; and in response to a negative check result, contact another data center that stores the data, wherein the another data center is able to delete a record of storage of the data for the second device.

10. The apparatus according to claim 9, wherein the computer-executable code are further configured to, when executed by the at least one processor, cause the apparatus to:
  inquire whether the owner decides to continue deduplication control;
  in response to a positive decision, cooperate with the data owner to update the ciphertext according to the deduplication policy of the data;
  in response to a negative decision, request another holder of the data for updating the ciphertext, or cooperate with the data owner to update the ciphertext according to a new deduplication policy, the new deduplication policy indicating deduplication to be controlled by only the authorized party.

11. An apparatus for managing data storage in a user device, the apparatus comprising:
  at least one processor; and
  at least one memory including computer-executable code, wherein the at least one memory and the computer-executable code are configured to, with the at least one processor, cause the apparatus to:
  transmit a request for storing a data to a data center;
  in response to a request for the data from the data center, transmit a data package comprising at least the data in plaintext or ciphertext to the data center, and the data package further comprising an index list, and a hash chain information, wherein a deduplication policy for the data is contained in the data package or can be determined according to the data package, the deduplication policy indicating deduplication to be controlled by both or either or none of an authorized party and an owner of the data, or only the authorized party, or only the data owner;
  in response to receiving a deduplication request from the data center or at least one other data center, issuing an attribute secret key to an eligible data holder according to an attribute based encryption scheme for conducting deduplication; and
  when the deduplication policy indicates deduplication to be controlled by both of the authorized party and the data owner, transmit in the data package a first cipherkey and a second cipherkey being not equal to each other, the first and second cipherkeys being generated by separating a data encryption key into a first data encryption key and a second data encryption key and encrypting the first and second data encryption keys respectively, the data encryption key being used for encrypting the data to obtain the ciphertext.

12. The apparatus according to claim 11, wherein the computer-executable code are further configured to, when executed by the at least one processor, cause the apparatus to:
  transmit in the data package the index list and the hash chain information for verifying holdership of the data for an eligible data holder, the index list comprising a plurality of indexes each indicating a specific part of the data, the hash chain information comprising a plurality of hash information each corresponding to one index.

13. The apparatus according to claim 11, wherein the computer-executable code are further configured to, when executed by the at least one processor, cause the apparatus to:
  transmit a request for storing a second data to the data center;
  in response to a request for a hash information corresponding to at least one index from the data center, transmit a calculated hash information corresponding to the at least one index to the data center for verifying the holdership of the second data.

14. The apparatus according to claim 13, wherein the computer-executable code are further configured to, when executed by the at least one processor, cause the apparatus to:
  receive a re-encrypted first cipherkey for the second data from the data center;
  decrypt the re-encrypted first cipherkey with a private key of the user device to obtain a first data encryption key;
  receive the attribute secret key from an owner of the second data, and receiving a second cipherkey for the second data from the owner of the second data or the data center;
  decrypt the second cipherkey with the attribute secret key to obtain the second data encryption key K;
  combine the first and second data encryption keys to obtain a third data encryption key for deduplication.

15. The apparatus according to claim 11, wherein the computer-executable code are further configured to, when executed by the at least one processor, cause the apparatus to:
  when the deduplication policy indicates deduplication to be controlled by either of the authorized party or the data owner, transmit in the data package the first and second cipherkeys being equal to each other;
  when the deduplication policy indicates deduplication to be controlled by only the authorized party or only the data owner, transmit in the data package only the first cipherkey or only the second cipherkey; and
  when the deduplication policy indicates deduplication to be controlled by none of the authorized party and the data owner, transmit the plaintext in the data package.

16. The apparatus according to claim 15, wherein the first data encryption key is encrypted with a public key of the authorized party according to a proxy re-encryption scheme; and
  wherein the second data encryption key is encrypted based on an access policy, the access policy containing user identities of users eligible for holding the data.

17. The apparatus according to claim 11, wherein the deduplication request for the data contains a user identity information;
  wherein the computer-executable code are further configured to, when executed by the at least one processor, cause the apparatus to:
  verify whether the user identity information represents a user eligible for holding the data; and
  in response to a positive verification result, generate the attribute secret key based on the user identity information.

18. The apparatus according to claim 11, wherein the computer-executable code are further configured to, when executed by the at least one processor, cause the apparatus to:
  transmit a request for deleting a data to the data center;
  in response to a request for a hash information corresponding to at least one index from the data center, transmit a calculated hash information corresponding to the at least one index to the data center for verifying the holdership of the data;

in response to a request to update the ciphertext from the data center or at least one further data center, update the ciphertext according to a deduplication policy of the data.

19. The apparatus according to claim 18, wherein the computer-executable code are further configured to, when executed by the at least one processor, cause the apparatus to:

when continuous deduplication control is needed, update the ciphertext according to an original deduplication policy of the data; and when no continuous deduplication control is needed, update the ciphertext according to a new deduplication policy, the new deduplication policy indicating deduplication to be controlled by only the authorized party.

20. The apparatus according to claim 11, wherein the computer-executable code are further configured to, when executed by the at least one processor, cause the apparatus to:

transmit a request for updating a ciphertext of a data to the data center, wherein a deduplication policy for the data is contained in the request or can be determined according to the request, the deduplication policy indicating deduplication to be controlled by both or either of an authorized party and an owner of the data, or only the authorized party, or only the data owner or none;

when the deduplication policy indicates that data owner deduplication control is needed, issue an attribute secret key to an eligible data holder according to an attribute based encryption scheme for conducting deduplication when the attribute secret key is not sent before.

* * * * *